United States Patent
Yeh et al.

(10) Patent No.: US 12,436,364 B2
(45) Date of Patent: Oct. 7, 2025

(54) IMAGING SYSTEM LENS ASSEMBLY, IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Cheng-Yu Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 503 days.

(21) Appl. No.: 17/994,237

(22) Filed: Nov. 25, 2022

(65) Prior Publication Data

US 2024/0126045 A1   Apr. 18, 2024

(30) Foreign Application Priority Data

Oct. 14, 2022   (TW) .................................. 111139030

(51) Int. Cl.
   *G02B 9/58*   (2006.01)
   *G02B 1/04*   (2006.01)

(52) U.S. Cl.
   CPC ............... *G02B 9/58* (2013.01); *G02B 1/041* (2013.01)

(58) Field of Classification Search
   CPC ....................................................... G02B 9/58
   See application file for complete search history.

(56) References Cited

U.S. PATENT DOCUMENTS

2018/0307007 A1   10/2018   Bone
2019/0056566 A1*   2/2019   Yoo ......................... G02B 13/02
2019/0137740 A1    5/2019   Ichihara
2020/0158991 A1*   5/2020   Kim ........................ G02B 13/004
2022/0091373 A1    3/2022   Saiga et al.

FOREIGN PATENT DOCUMENTS

| CN | 106873133 A | 6/2017 |
| CN | 105044886 B | 7/2017 |
| CN | 110456487 A | 11/2019 |
| CN | 112698501 A | 4/2021 |
| CN | 112764198 A | 5/2021 |
| CN | 113341539 B | 8/2022 |
| JP | S49-053421 A | 5/1974 |
| JP | S55-105216 A | 8/1980 |
| KR | 10-1802036 B1 | 11/2017 |
| WO | 2022/066784 A1 | 3/2022 |

OTHER PUBLICATIONS

Taiwan Office Action dated Mar. 20, 2023 as received in application No. 111139030.
Extended European Search Report dated Apr. 5, 2024 as received in Application No. 22213578.2.

* cited by examiner

*Primary Examiner* — Edmond C Lau
(74) *Attorney, Agent, or Firm* — Maschoff Brennan

(57) ABSTRACT

An imaging system lens assembly includes, in order from an object side to an image side: a first lens element, a second lens element, a third lens element and a fourth lens element. Each of the four lens elements has an object-side surface facing toward the object side and an image-side surface facing toward the image side. The second lens element has positive refractive power. The object-side surface of the third lens element is convex in a paraxial region thereof.

26 Claims, 29 Drawing Sheets

IMAGING SYSTEM LENS ASSEMBLY, IMAGE CAPTURING UNIT AND ELECTRONIC DEVICE

RELATED APPLICATIONS

This application claims priority to Taiwan Application 111139030, filed on Oct. 14, 2022, which is incorporated by reference herein in its entirety.

BACKGROUND

Technical Field

The present disclosure relates to an imaging system lens assembly, an image capturing unit and an electronic device, more particularly to an imaging system lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging system lens assembly includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side. Preferably, the object-side surface of the first lens element is convex in a paraxial region thereof, the second lens element has positive refractive power, and the object-side surface of the third lens element is convex in a paraxial region thereof. When an axial distance between the object-side surface of the first lens element and the image-side surface of the fourth lens element is TD, an axial distance between the image-side surface of the fourth lens element and an image surface is BL, an f-number of the imaging system lens assembly is Fno, an Abbe number of the first lens element is V1, a refractive index of the first lens element is N1, a curvature radius of the object-side surface of the third lens element is R5, a curvature radius of the image-side surface of the third lens element is R6, a curvature radius of the object-side surface of the fourth lens element is R7, and a curvature radius of the image-side surface of the fourth lens element is R8, the following conditions are preferably satisfied:

$0<TD/BL<0.42$;

$1.0<Fno<4.0$;

$22.0<V1/N1<40.5$; and $0<(|R5|+|R6|)/(|R7|+|R8|)<1.2$.

According to another aspect of the present disclosure, an imaging system lens assembly includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side. Preferably, the second lens element has positive refractive power, the image-side surface of the second lens element is concave in a paraxial region thereof, and the object-side surface of the third lens element is convex in a paraxial region thereof. When an axial distance between the object-side surface of the first lens element and the image-side surface of the fourth lens element is TD, an axial distance between the image-side surface of the fourth lens element and an image surface is BL, an Abbe number of the first lens element is V1, an Abbe number of the second lens element is V2, an Abbe number of the third lens element is V3, a focal length of the second lens element is f2, and a focal length of the fourth lens element is f4, the following conditions are preferably satisfied:

$0<TD/BL<0.42$;

$16.0<(V2+V3)-V1<40.0$; and $f2/f4<0.48$.

According to another aspect of the present disclosure, an imaging system lens assembly includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side. Preferably, the first lens element has positive refractive power, the second lens element has positive refractive power, the object-side surface of the third lens element is convex in a paraxial region thereof, and the image-side surface of the third lens element is concave in a paraxial region thereof. When an axial distance between the object-side surface of the first lens element and the image-side surface of the fourth lens element is TD, an axial distance between the image-side surface of the fourth lens element and an image surface is BL, an f-number of the imaging system lens assembly is Fno, a curvature radius of the image-side surface of the second lens element is R4, a curvature radius of the image-side surface of the fourth lens element is R8, a focal length of the first lens element is f1, and a focal length of the second lens element is f2, the following conditions are preferably satisfied:

$0<TD/BL<0.42$;

$1.0<Fno<4.0$;

$-10.0<(R4+R8)/(R4-R8)<0.4$; and $0.90<f1/f2<5.0$.

According to another aspect of the present disclosure, an image capturing unit includes one of the aforementioned imaging system lens assemblies and an image sensor, wherein the image sensor is disposed on an image surface of the imaging system lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
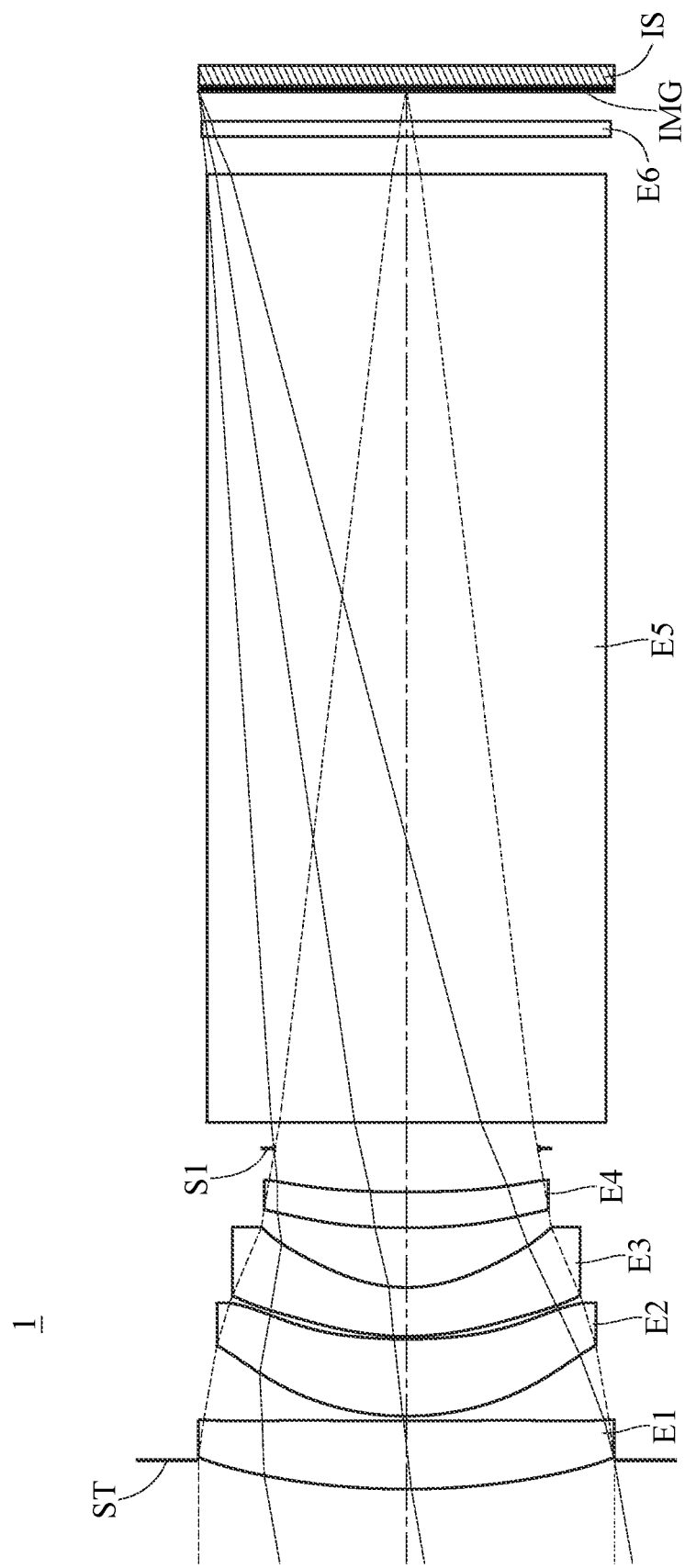
FIG. 1 is a schematic view of an image capturing unit according to the 1st embodiment of the present disclosure.

An imaging system lens assembly includes at least one lens elements. The imaging system lens assembly includes four lens elements. The four lens elements are, in order from an object side to an image side along an optical path, a first lens element, a second lens element, a third lens element and a fourth lens element. Each of the four lens elements of the imaging system lens assembly has an object-side surface facing toward the object side and an image-side surface facing toward the image side.

The first lens element can have positive refractive power. Therefore, it is favorable for reducing the size of the imaging system lens assembly. The object-side surface of the first lens element can be convex in a paraxial region thereof. Therefore, it is favorable for adjusting the refractive power of the first lens element.

The second lens element has positive refractive power. Therefore, it is favorable for meeting the requirement of compactness. The object-side surface of the second lens element can be convex in a paraxial region thereof. Therefore, it is favorable for increasing the symmetry of the imaging system lens assembly so as to improve image quality. The image-side surface of the second lens element can be concave in a paraxial region thereof. Therefore, it is favorable for balancing spherical aberration and coma.

The object-side surface of the third lens element is convex in a paraxial region thereof. Therefore, it is favorable for the third lens element having sufficient light converging capability so as to achieve compactness. The image-side surface of the third lens element can be concave in a paraxial region thereof. Therefore, it is favorable for balancing the back focal length of the imaging system lens assembly while correcting off-axis aberrations.

When an axial distance between the object-side surface of the first lens element and the image-side surface of the fourth lens element is TD, and an axial distance between the image-side surface of the fourth lens element and an image surface is BL, the following condition is satisfied: $0<TD/BL<0.42$. Therefore, it is favorable for properly adjusting the back focal length so as to enable optical path folding of the imaging system lens assembly. Moreover, the following condition can also be satisfied: $0.15<TD/BL<0.38$. Moreover, the following condition can also be satisfied: $0.22<TD/BL<0.35$.

When an f-number of the imaging system lens assembly is Fno, the following condition can be satisfied: $1.0<Fno<4.0$. Therefore, it is favorable for obtaining a balance between illuminance and the depth of field as well as increasing the amount of incident light so as to improve image quality. Moreover, the following condition can also be satisfied: $2.0<Fno<3.5$. Moreover, the following condition can also be satisfied: $2.5<Fno<3.2$.

When an Abbe number of the first lens element is V1, and a refractive index of the first lens element is N1, the following condition can be satisfied: $22.0<V1/N1<40.5$. Therefore, it is favorable for effectively reducing the sensitivity of the material of the first lens element to environment so as to be highly stable in various environments. Moreover, the following condition can also be satisfied: $30.0<V1/N1<39.5$. Moreover, the following condition can also be satisfied: $33.0<V1/N1<39.0$.

When a curvature radius of the object-side surface of the third lens element is R5, a curvature radius of the image-side surface of the third lens element is R6, a curvature radius of the object-side surface of the fourth lens element is R7, and a curvature radius of the image-side surface of the fourth lens element is R8, the following condition can be satisfied: $0<(|R5|+|R6|)/(|R7|+|R8|)<1.2$. Therefore, it is favorable for balancing the surface shapes of the third lens element and the fourth lens element so that the third lens element has a strong capability of controlling the optical path and the fourth lens element can balance the controlled optical path. Moreover, the following condition can also be satisfied: $0.05<(|R5|+|R6|)/(|R7|+|R8|)<1.0$. Moreover, the following condition can also be satisfied: $0.1<(|R5|+|R6|)/(|R7|+|R8|)<0.7$.

When the Abbe number of the first lens element is V1, an Abbe number of the second lens element is V2, and an Abbe number of the third lens element is V3, the following condition can be satisfied: $16.0<(V2+V3)-V1<40.0$. Therefore, it is favorable for effectively correcting focus positions at different wavelengths so as to prevent overlayed images. Moreover, the following condition can also be satisfied: $18.0<(V2+V3)-V1<30.0$.

When a focal length of the second lens element is f2, and a focal length of the fourth lens element is f4, the following condition can be satisfied: $f2/f4<0.48$. Therefore, it is favorable for adjusting the refractive power distribution of lens elements so as to balance the back focal length of the imaging system lens assembly for more various applications. Moreover, the following condition can also be satisfied: $-5.0<f2/f4<0.30$. Moreover, the following condition can also be satisfied: $-2.0<f2/f4<0.15$.

When a curvature radius of the image-side surface of the second lens element is R4, and the curvature radius of the image-side surface of the fourth lens element is R8, the following condition can be satisfied: $-10.0<(R4+R8)/(R4-R8)<0.4$. Therefore, it is favorable for having a relatively strong refraction capability of the image-side surface of the second lens element so as to control the travelling direction of the optical path. Moreover, the following condition can also be satisfied: $-5.0<(R4+R8)/(R4-R8)<0.1$. Moreover, the following condition can also be satisfied: $-3.0<(R4+R8)/(R4-R8)<-0.5$. Moreover, the following condition can also be satisfied: $-2.5<(R4+R8)/(R4-R8)<-1.0$. Moreover, the following condition can also be satisfied: $-6.0<(R4+R8)/(R4-R8)<-1.2$.

When a focal length of the first lens element is f1, and the focal length of the second lens element is f2, the following condition can be satisfied: $0.90<f1/f2<5.0$. Therefore, it is favorable for adjusting the refractive power of the first lens element and that of the second lens element so as to increase the symmetry of the imaging system lens assembly and reduce the size of light spot at the central field. Moreover, the following condition can also be satisfied: $0.92<f1/f2<3.0$. Moreover, the following condition can also be satisfied: $0.94<f1/f2<2.0$.

When an axial distance between the object-side surface of the first lens element and the image surface is TL, and a maximum image height of the imaging system lens assembly (which can be half of a diagonal length of an effective photosensitive area of an image sensor) is ImgH, the following condition can be satisfied: $4.5<TL/ImgH<15.0$. Therefore, it is favorable for balancing the total track length and the image height of the imaging system lens assembly so as to reduce the size of the imaging system lens assembly and provide a telephoto configuration. Moreover, the following condition can also be satisfied: $5.5<TL/ImgH<10.0$. Moreover, the following condition can also be satisfied: $6.0<TL/ImgH<8.5$.

When the curvature radius of the object-side surface of the third lens element is R5, and the curvature radius of the object-side surface of the fourth lens element is R7, the following condition can be satisfied: $-5.5<(R5+R7)/(R5-R7)<2.0$. Therefore, it is favorable for the third lens element and the fourth element having proper surface shapes for improving light convergence at the center of image. Moreover, the following condition can also be satisfied: $-4.0<(R5+R7)/(R5-R7)<0$.

When the focal length of the second lens element is f2, and the curvature radius of the image-side surface of the second lens element is R4, the following condition can be satisfied: $0<f2/R4<2.75$. Therefore, it is favorable for effectively balancing the refractive power and the surface shape of the lens element so as to correct aberrations and eliminate stray light in the lens element. Moreover, the following condition can also be satisfied: $1.0<f2/R4<2.60$. Moreover, the following condition can also be satisfied: $1.5<f2/R4<2.50$.

When a focal length of the imaging system lens assembly is f, the focal length of the second lens element is f2, and a focal length of the third lens element is f3, the following condition can be satisfied: $0.60<f/(|f2|+|f3|)<0.80$. Therefore, it is favorable for the second lens element and the third lens element having proper refractive power for achieving compactness. Moreover, the following condition can also be satisfied: $0.62<f/(|f2|+|f3|)<0.78$.

When an axial distance between the third lens element and the fourth lens element is T34, and a central thickness of the fourth lens element is CT4, the following condition can be satisfied: $1.35<T34/CT4<5.0$. Therefore, it is favorable for having sufficient space between the third lens element and the fourth lens element so as to enhance design flexibility. Moreover, the following condition can also be satisfied: $1.45<T34/CT4<3.0$.

When the axial distance between the object-side surface of the first lens element and the image-side surface of the fourth lens element is TD, a central thickness of the second lens element is CT2, and a central thickness of the third lens element is CT3, the following condition can be satisfied: $0<TD/(CT2+CT3)<3.0$. Therefore, it is favorable for balancing the space arrangement of the second lens element and the third lens element so as to achieve thinness of the imaging system lens assembly. Moreover, the following condition can also be satisfied: $2.0<TD/(CT2+CT3)<2.8$.

When a sum of central thicknesses of all lens elements of the imaging system lens assembly is ΣCT, and a sum of axial distances between each of all adjacent lens elements of the imaging system lens assembly is ΣAT, the following condition can be satisfied: $3.1<\Sigma CT/\Sigma AT<4.2$. Therefore, it is favorable for adjusting the distribution of the lens elements as well as obtaining a balance between central thicknesses and axial distances so as to improve space utilization efficiency. Moreover, the following condition can also be satisfied: $3.2<\Sigma CT/\Sigma AT<4.0$. Moreover, the following condition can also be satisfied: $3.3<\Sigma CT/\Sigma AT<3.9$.

When the curvature radius of the image-side surface of the second lens element is R4, and the curvature radius of the object-side surface of the third lens element is R5, the following condition can be satisfied: $0<R4/R5<2.0$. Therefore, it is favorable for adjusting the curvature radii of adjacent lens surfaces of the second lens element and the third lens element so as to correct aberrations at the peripheral field, such as astigmatism. Moreover, the following condition can also be satisfied: $1.0<R4/R5<1.5$.

When the Abbe number of the first lens element is V1, and the Abbe number of the second lens element is V2, the following condition can be satisfied: $0\leq|V1-V2|<7.0$. Therefore, it is favorable for improving the water resistance and acid resistance of the imaging system lens assembly as well as reducing the influence of temperature effects on imaging. Moreover, the following condition can also be satisfied: $1.0<|V1-V2|<6.0$.

When a maximum effective radius of the object-side surface of the first lens element is Y1R1, and a maximum effective radius of the image-side surface of the fourth lens element is Y4R2, the following condition can be satisfied: $0<Y4R2/Y1R1<1.0$. Therefore, it is favorable for controlling the beam size as well as reducing the incident angle on an optical path folding element so as to reduce the outer diameter of the imaging system lens assembly. Moreover, the following condition can also be satisfied: $0.5<Y4R2/Y1R1<0.8$. Please refer to FIG. 22, which shows a schematic view of Y1R1 and Y4R2 according to the 1st embodiment of the present disclosure.

When half of a maximum field of view of the imaging system lens assembly is HFOV, the following condition can be satisfied: $8.0$ degrees$<$HFOV$<20.0$ degrees. Therefore, it is favorable for the imaging system lens assembly having a proper field of view for telephoto application. Moreover, the following condition can also be satisfied: $9.0$ [deg.] $<$HFOV$<15.0$ [deg.].

According to the present disclosure, the imaging system lens assembly can include at least one reflective element. The reflective element can include a prism or a reflective mirror, and the reflective element can include at least two reflective surfaces to have optical path folding function. The reflective element can be disposed between an imaged object and the image surface. Therefore, the imaging system lens assembly can have a deflected optical path and can be more flexible in space arrangement, and therefore the dimensions of an electronic device is not restricted by the total track length of the imaging system lens assembly, thereby reducing mechanical limitation, miniaturizing the imaging system lens assembly, and thus achieving various specification requirements. Moreover, the reflective element can be disposed at an object side of the object-side surface of the first lens element or an image side of the image-side surface of the fourth lens element. Moreover, the reflective element can be disposed between the fourth lens element and the image surface.

When the axial distance between the image-side surface of the fourth lens element and the image surface is BL, and the focal length of the imaging system lens assembly is f, the following condition can be satisfied: $0.75<BL/f<2.0$. Therefore, it is favorable for adjusting the imaging system lens assembly to have a good viewing angle so as to be applied in various fields. Moreover, the following condition can also be satisfied: $0.85<BL/f<1.2$.

According to the present disclosure, an air gap in a paraxial region can be located between each of all adjacent lens elements among the first lens element through the fourth lens element. Therefore, it is favorable for ensuring easy assembly of the lens elements so as to increase the assembling yield rate.

When a central thickness of the first lens element is CT1, and the central thickness of the third lens element is CT3, the following condition can be satisfied: $0<CT1/CT3<2.35$. Therefore, it is favorable for balancing the thickness ratio of the first lens element to the third lens element so as to control the size of the imaging system lens assembly. Moreover, the following condition can also be satisfied: $1.0<CT1/CT3<2.2$.

When the focal length of the second lens element is f2, and a composite focal length of the second lens element and the third lens element is f23, the following condition can be satisfied: $-0.40<f2/f23<-0.15$. Therefore, it is favorable for balancing the refractive power distribution of the second lens element and the third lens element so as to obtain a balance between compact imaging system lens assembly and high image quality. Moreover, the following condition can also be satisfied: $-0.38<f2/f23<-0.20$.

When a displacement in parallel with an optical axis from an axial vertex of the image-side surface of the third lens element to a maximum effective radius position of the image-side surface of the third lens element is Sag3R2, and the central thickness of the third lens element is CT3, the following condition can be satisfied: $0<Sag3R2/CT3<1.45$. Therefore, it is favorable for the periphery of the third lens element controlling the traveling direction of light as well as adjusting the curvature degree at the periphery thereof so as to reduce manufacturing difficulty. Moreover, the following condition can also be satisfied: $0.5<Sag3R2/CT3<1.35$. Moreover, the following condition can also be satisfied: $1.1<Sag3R2/CT3<1.30$. Please refer to FIG. 22 which shows a schematic view of Sag3R2 according to the 1st embodiment of the present disclosure. When the direction from the axial vertex of one surface to the maximum effective radius position of the same surface is facing towards the image side of the imaging system lens assembly, the value of displacement is positive; when the direction from the axial vertex of the surface to the maximum effective radius position of the same surface is facing towards the object side of the imaging system lens assembly, the value of displacement is negative.

When the focal length of the second lens element is f2, and a curvature radius of the object-side surface of the first lens element is R1, the following condition can be satisfied: $0<f2/R1<2.0$. Therefore, it is favorable for adjusting the refractive power of the imaging system lens assembly and the shape of the object-side surface of the first lens element so as to enhance imaging effect. Moreover, the following condition can also be satisfied: $0.8<f2/R1<1.85$. Moreover, the following condition can also be satisfied: $1.4<f2/R1<1.75$.

When the central thickness of the second lens element is CT2, the central thickness of the third lens element is CT3, and the sum of axial distances between each of all adjacent lens elements of the imaging system lens assembly is $\Sigma AT$, the following condition can be satisfied: $1.45<(CT2+CT3)/\Sigma AT<2.5$. Therefore, it is favorable for balancing the central thicknesses of the lens elements and the axial distances between adjacent lens surfaces so as to maintain suitable space arrangement. Moreover, the following condition can also be satisfied: $1.7<(CT2+CT3)/\Sigma AT<2.2$.

When the central thickness of the third lens element is CT3, and the axial distance between the third lens element and the fourth lens element is T34, the following condition can be satisfied: $0.52<CT3/T34<1.38$. Therefore, it is favorable for balancing the central thickness of the third lens element and the axial distance between the third lens element and the fourth lens element so as to achieve diversity application design. Moreover, the following condition can also be satisfied: 0.60<CT3/T34<1.20. Moreover, the following condition can also be satisfied: 0.70<CT3/T34<1.10.

Figure 22:
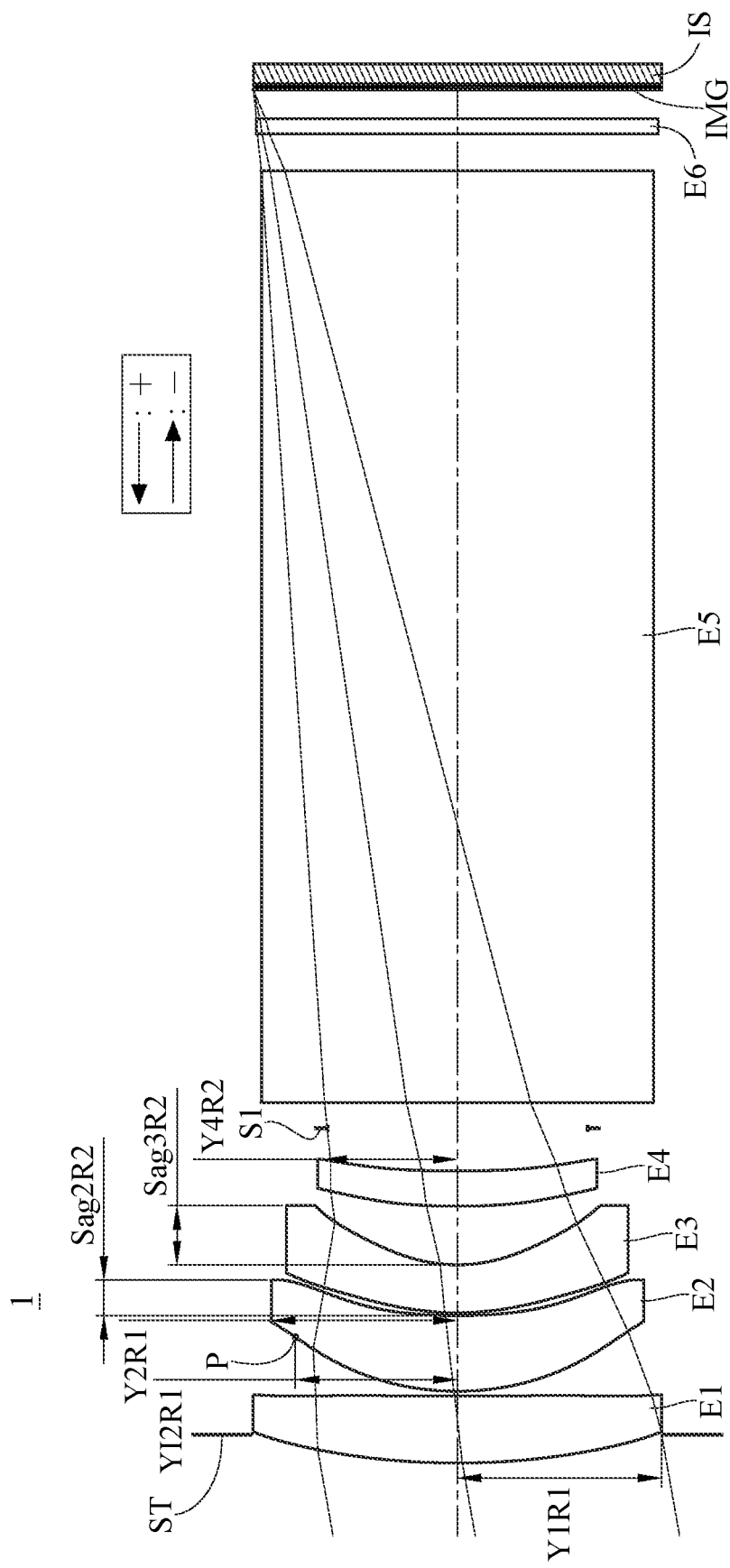
FIG. 22 shows a schematic view of Y1R1, YI2R1, Y2R1, Sag2R2, Sag3R2, Y4R2, and one inflection point on the object-side surface of the second lens element according to the 1st embodiment of the present disclosure.

When a vertical distance between an inflection point on the object-side surface of the second lens element and the optical axis is YI2R1, and a maximum effective radius of the object-side surface of the second lens element is Y2R1, the following condition can be satisfied: 0.5<YI2R1/Y2R1<0.95. Therefore, it is favorable for correcting distortion so as to prevent deformation at the peripheral image. Moreover, the following condition can also be satisfied: 0.7<YI2R1/Y2R1<0.94. Moreover, the following condition can also be satisfied: 0.75<YI2R1/Y2R1<0.93. Please refer to FIG. 22 which shows a schematic view of YI2R1, Y2R1, and one inflection point P on the object-side surface of the second lens element E2 according to the 1st embodiment of the present disclosure. The abovementioned inflection point P on the object-side surface of the second lens element in FIG. 22 is only exemplary. Each of lens surfaces in various embodiments of the present disclosure may also have one or more inflection points.

According to the present disclosure, the imaging system lens assembly can include an aperture stop. The aperture stop can be disposed between the imaged object and the second lens element. Moreover, the aperture stop can be disposed between the imaged object and the first lens element. Therefore, it is favorable for ensuring a large aperture at the object side of the imaging system lens assembly for receiving more amount of light while controlling the field of view to achieve a telephoto photography effect.

When the axial distance between the image-side surface of the fourth lens element and the image surface is BL, and the maximum image height of the imaging system lens assembly is ImgH, the following condition can be satisfied: 3.0<BL/ImgH<8.0. Therefore, it is favorable for having a sufficient back focal length for configuring additional optical elements while controlling the incident angle on the image surface so as to ensure illuminance at the peripheral image. Moreover, the following condition can also be satisfied: 4.5<BL/ImgH<6.5.

When the focal length of the imaging system lens assembly is f, the curvature radius of the object-side surface of the fourth lens element is R7, and the curvature radius of the image-side surface of the fourth lens element is R8, the following condition can be satisfied: −0.8<f/(R7+R8)<1.1. Therefore, it is favorable for controlling the lens shape so that the fourth lens element can act as a correction lens to enhance the correction of off-axis aberrations. Moreover, the following condition can also be satisfied: −0.2<f/(R7+R8)<0.8.

When a displacement in parallel with the optical axis from an axial vertex of the image-side surface of the second lens element to a maximum effective radius position of the image-side surface of the second lens element is Sag2R2, and the central thickness of the second lens element is CT2, the following condition can be satisfied: 0.30<Sag2R2/CT2<0.60. Therefore, it is favorable for balancing the curvature degree at the periphery of the image-side surface of the second lens element so as to minimize the refraction angle. Moreover, the following condition can also be satisfied: 0.40<Sag2R2/CT2<0.55. Please refer to FIG. 22 which shows a schematic view of Sag2R2 according to the 1st embodiment of the present disclosure.

When the Abbe number of the first lens element is V1, and the Abbe number of the third lens element is V3, the following condition can be satisfied: 20.0<V1−V3<39.0. Therefore, it is favorable for selecting proper material for the lens elements so as to correct chromatic aberration. Moreover, the following condition can also be satisfied: 25.0<V1−V3<38.0. Moreover, the following condition can also be satisfied: 30.0<V1−V3<37.0.

According to the present disclosure, the imaging system lens assembly can include at least one positive lens element, and an Abbe number of the positive lens element can be smaller than 30.0. Therefore, it is favorable for correcting chromatic aberration generated by the imaging system lens assembly as well as bringing out the telephoto characteristics such as a long focal length and a small field of view.

According to the present disclosure, the aforementioned features and conditions can be utilized in numerous combinations so as to achieve corresponding effects.

According to the present disclosure, the lens elements of the imaging system lens assembly can be made of either glass or plastic material. When the lens elements are made of glass material, the refractive power distribution of the imaging system lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging system lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging system lens assembly, based on the corresponding image sensor, can be flat or curved, especially a curved surface being concave facing towards the object side of the imaging system lens assembly.

According to the present disclosure, an image correction unit, such as a field flattener, can be optionally disposed between the lens element closest to the image side of the imaging system lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, at least one reflective element, such as a prism or a mirror, can be optionally provided, such that the imaging system lens assembly can be more flexible in space arrangement. The reflective element can be disposed between the imaged object and the image surface so as to reduce the size of the imaging system lens assembly. The optical path can be deflected at least one time by the reflective element. An angle between a normal direction of the reflective surface and the optical axis is not limited to 45 degrees, but can be other angles depending on the space arrangement. The optical path along an optical axis at the object side can be redirected to an optical axis at the image side by the reflective element. An angle between the optical axis at the object side and that at the image side can be any angle, such as 0, 90 or 180 degrees. Furthermore, in order to reduce the space for accommodating the imaging system lens assembly, the length and the width of the mirror may be unequal to each other, and the length, the width and the height of the prism may be unequal to one another. The surface shape of the reflective element can be flat, aspheric or freeform according to the optical design requirements, but the present disclosure is not limited thereto. The reflective element can consist of more than one prism depending on the design requirements. The prism can be made of glass or plastic depending on the design requirements.

Figure 23:
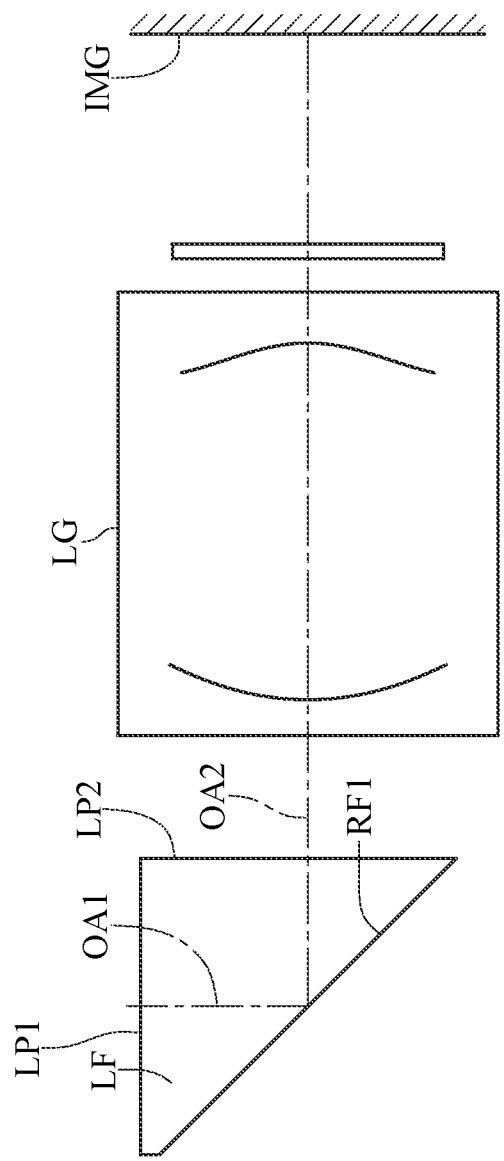
FIG. 23 and FIG. 24 each show a schematic view of a configuration of one light-folding element in an imaging system lens assembly according to one embodiment of the present disclosure.
Figure 24:
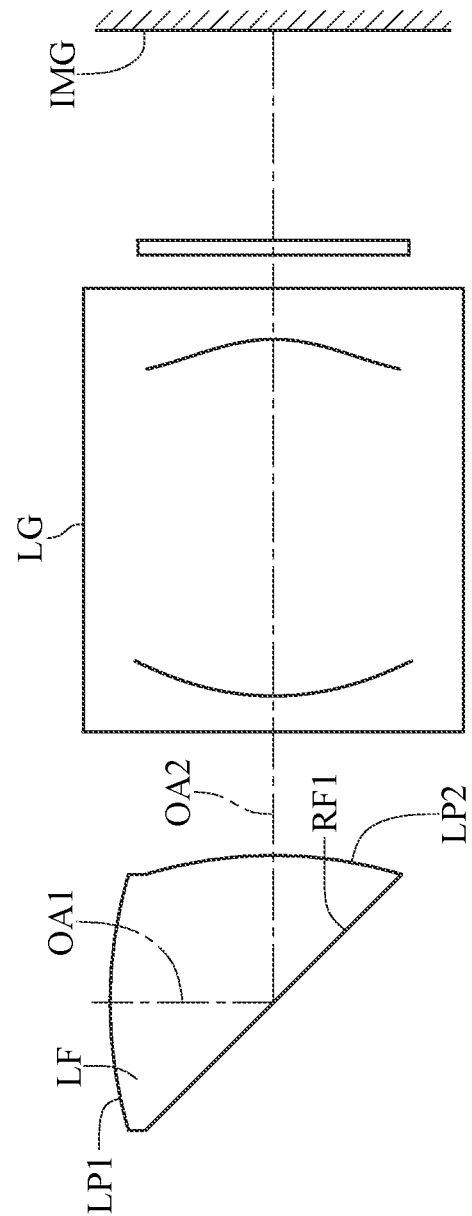

FIG. 23 and FIG. 24 each show a schematic view of a configuration of one light-folding element in an imaging system lens assembly according to one embodiment of the present disclosure. In FIG. 23 and FIG. 24, the imaging system lens assembly can include, in order from an imaged object (not shown in the figures) to an image surface IMG along an optical path, a reflective element LF, a lens group LG and the image surface IMG. The reflective element LF can be disposed between the imaged object and the lens group LG. The reflective element LF has a transmissive surface LP1, a reflective surface RF1 and a transmissive surface LP2 sequentially along the travelling direction of light on the optical path. The optical path can enter the reflective element LF through the transmissive surface LP1 along a first optical axis OA1, deflect off the reflective surface RF1, pass through the transmissive surface LP2 and then enter the lens group LG along a second optical axis OA2. In FIG. 23, the transmissive surfaces LP1 and LP2 can be both flat. In FIG. 24, the transmissive surfaces LP1 and LP2 can be both curved.

Figure 25:
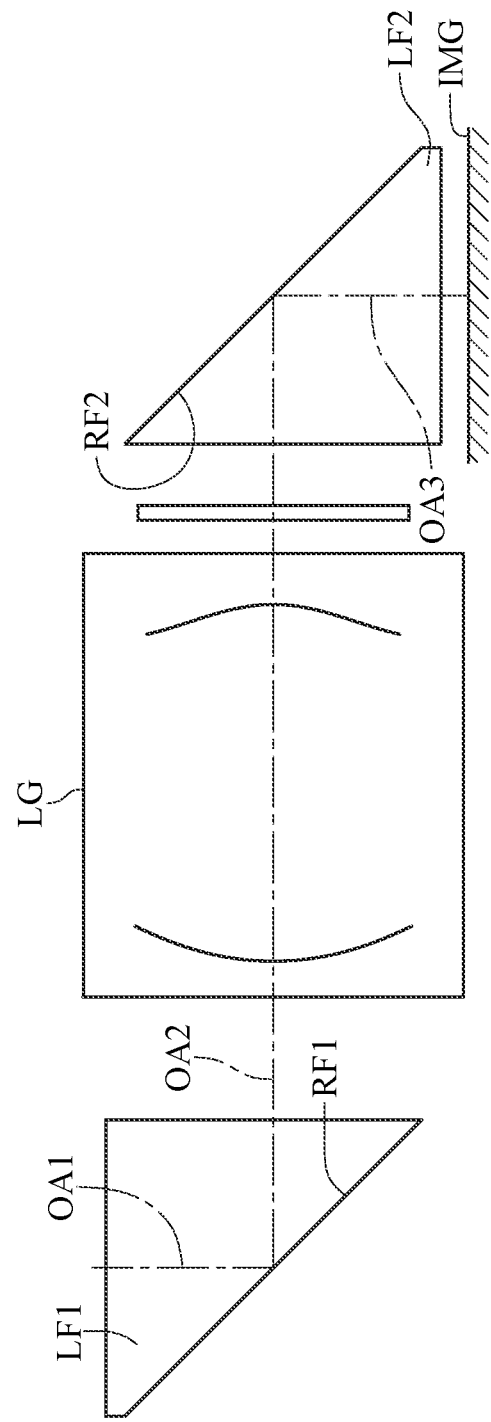
FIG. 25 and FIG. 26 each show a schematic view of a configuration of two light-folding elements in an imaging system lens assembly according to one embodiment of the present disclosure.
Figure 26:
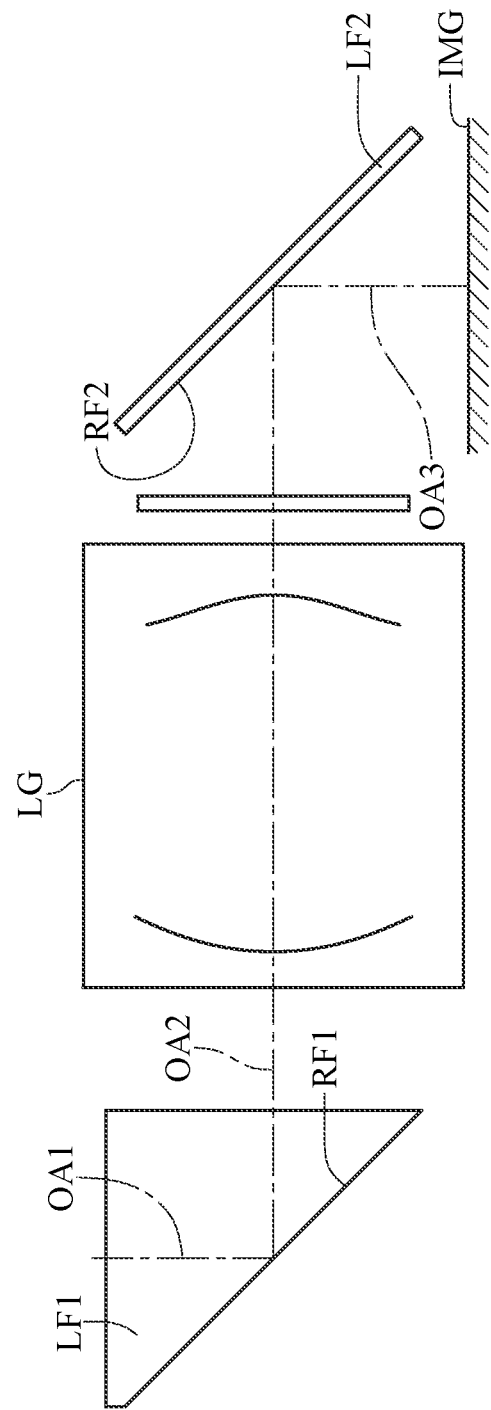

FIG. 25 and FIG. 26 each show a schematic view of a configuration of two light-folding elements in an imaging system lens assembly according to one embodiment of the present disclosure. In FIG. 25 and FIG. 26, the imaging system lens assembly can include, in order from an imaged object (not shown in the figures) to an image surface IMG along an optical path, a reflective element LF1, a lens group LG, a reflective element LF2 and the image surface IMG. The reflective element LF1 can be disposed between the imaged object and a lens group LG, and the reflective element LF2 can be disposed between the lens group LG and the image surface IMG. The optical path can enter the reflective element LF1 along a first optical axis OA1, deflect off a reflective surface RF1 of the reflective element LF1, pass through the lens group LG and enter the reflective element LF2 along a second optical axis OA2, deflect off a reflective surface RF2 of the reflective element LF2, and then extend onto the image surface IMG along a third optical axis OA3. In FIG. 25, each of the reflective elements LF1 and LF2 can be a prism. In FIG. 26, the reflective elements LF1 and LF2 can be a prism and a reflective mirror, respectively.

Figure 27:
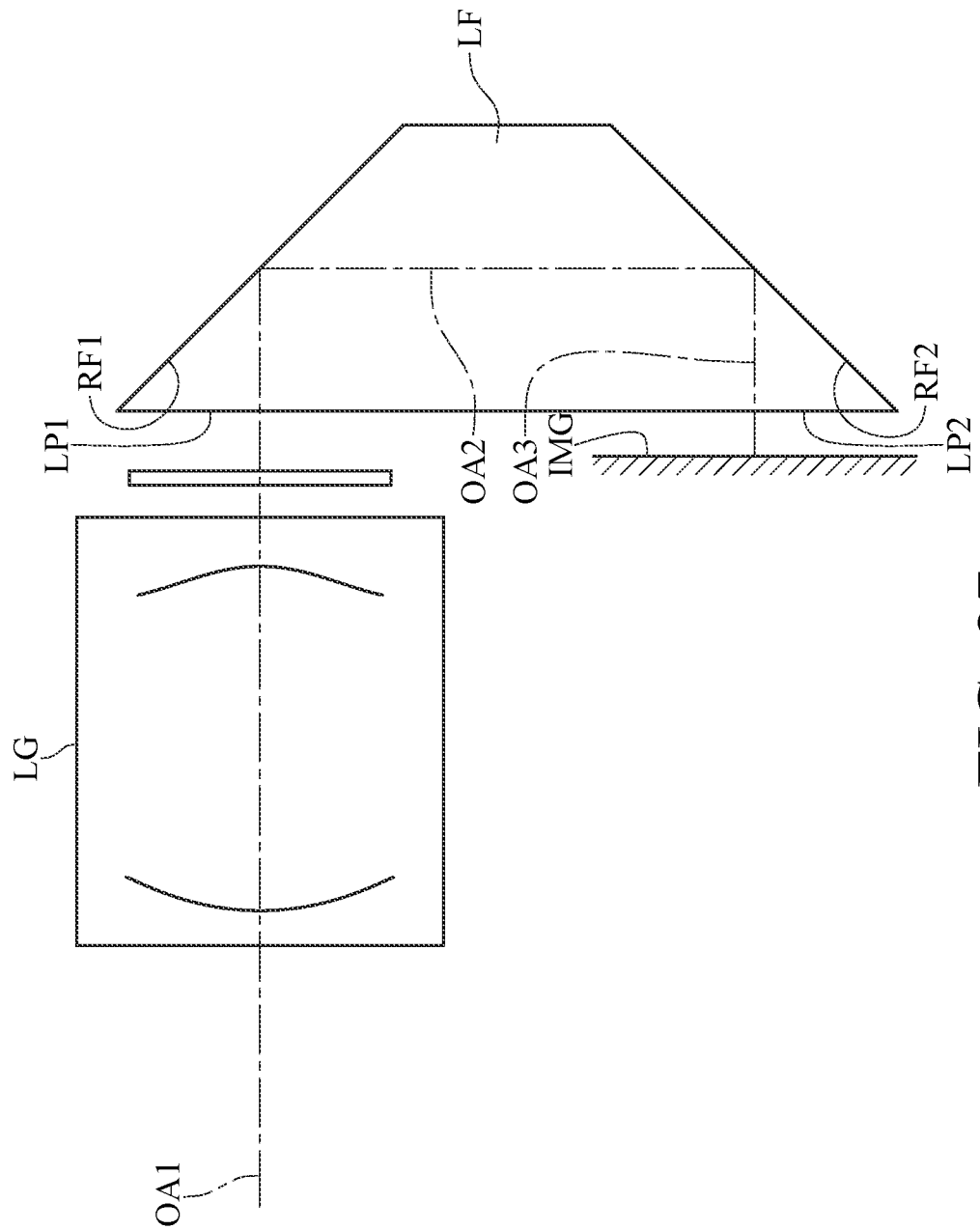
FIG. 27 through FIG. 29 each show a schematic view of another configuration of one light-folding element in an imaging system lens assembly according to one embodiment of the present disclosure.
Figure 28:
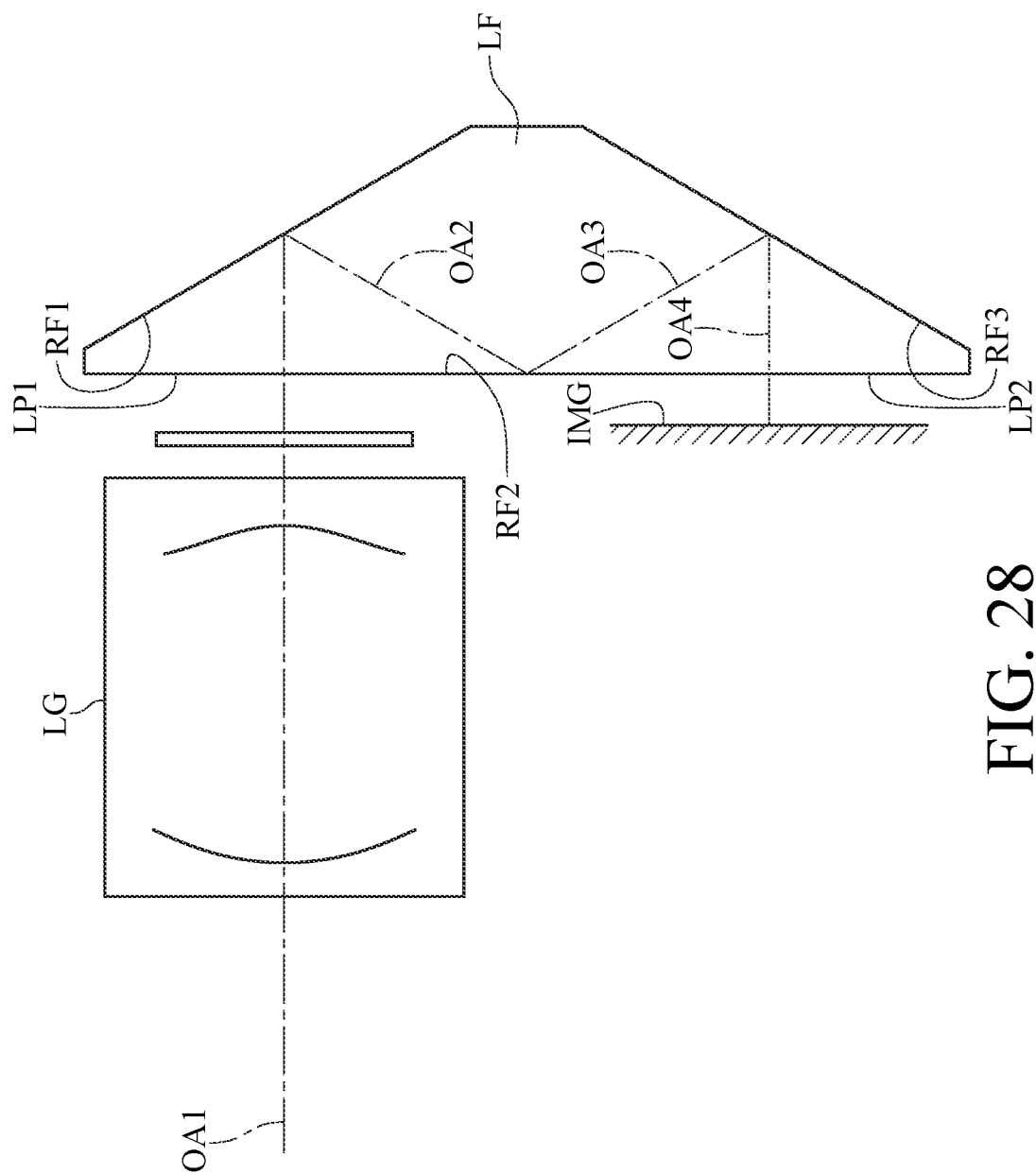
Figure 29:
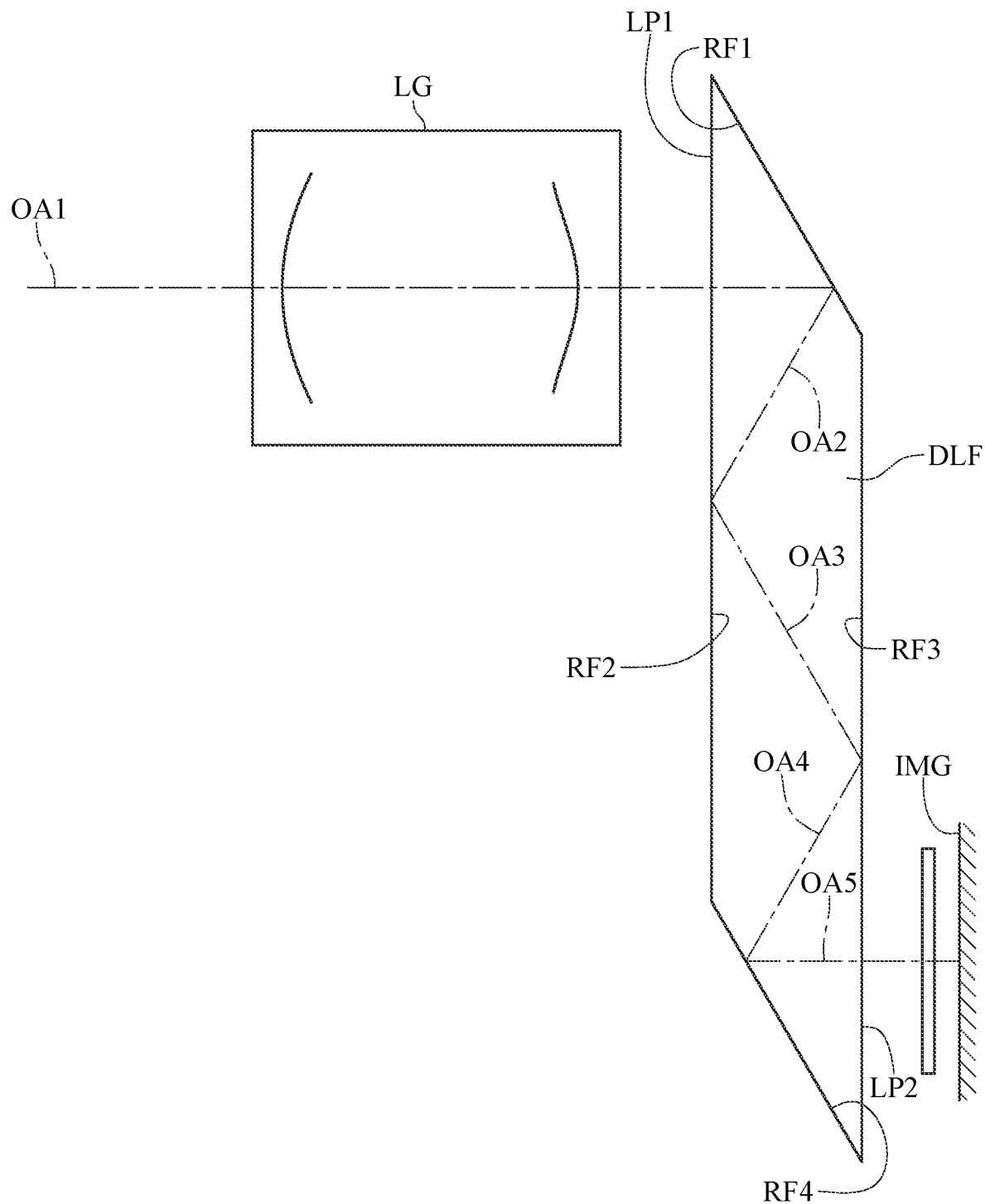

FIG. 27 through FIG. 29 each show a schematic view of another configuration of one light-folding element in an imaging system lens assembly according to one embodiment of the present disclosure. In FIG. 27, the imaging system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF has a transmissive surface LP1, a reflective surface RF1, a reflective surface RF2 and a transmissive surface LP2 sequentially along the travelling direction of light on the optical path. The optical path can enter the reflective element LF along a first optical axis OA1, deflect off the reflective surface RF1, reach the reflective surface RF2 along a second optical axis OA2, deflect off the reflective surface RF2, and then extend onto the image surface IMG along a third optical axis OA3.

In FIG. 28, the imaging system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF has a transmissive surface LP1, a reflective surface RF1, a reflective surface RF2, a reflective surface RF3 and a transmissive surface LP2 sequentially along the travelling direction of light on the optical path. The optical path can enter the reflective element LF along a first optical axis OA1, deflect off the reflective surface RF1, reach the reflective surface RF2 along a second optical axis OA2, deflect off the reflective surface RF2, reach the reflective surface RF3 along a third optical axis OA3, deflect off the reflective surface RF3, and then extend onto the image surface IMG along a fourth optical axis OA4.

In FIG. 29, the imaging system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF has a transmissive surface LP1, a reflective surface RF1, a reflective surface RF2, a reflective surface RF3, a reflective surface RF4 and a transmissive surface LP2 sequentially along the travelling direction of light on the optical path. The optical path can enter the reflective element LF along a first optical axis OA1, deflect off the reflective surface RF1, reach the reflective surface RF2 along a second optical axis OA2, deflect off the reflective surface RF2, reach the reflective surface RF3 along a third optical axis OA3, deflect off the reflective surface RF3, reach the reflective surface RF4 along a fourth optical axis OA4, deflect off the reflective surface RF4, and then extend onto the image surface IMG along a fifth optical axis OA5.

The imaging system lens assembly can be optionally provided with three or more reflective elements, and the present disclosure is not limited to the type, number and position of the reflective elements of the embodiments disclosed in the aforementioned figures.

According to the present disclosure, the imaging system lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging system lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging system lens assembly and thereby provides a wider field of view for the same.

According to the present disclosure, the imaging system lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging system lens assembly can include one or more optical elements for limiting the form of light passing through the imaging system lens assembly. Each optical element can be, but not limited to, a filter, a polarizer, etc., and each optical element can be, but not limited to, a single-piece element, a composite component, a thin film, etc. The optical element can be located at the object side or the image side of the imaging system lens assembly or between any two adjacent lens elements so as to allow light in a specific form to pass through, thereby meeting application requirements.

According to the present disclosure, the imaging system lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the above description of the present disclosure, the following specific embodiments are provided for further explanation.

1st Embodiment

Figure 2:
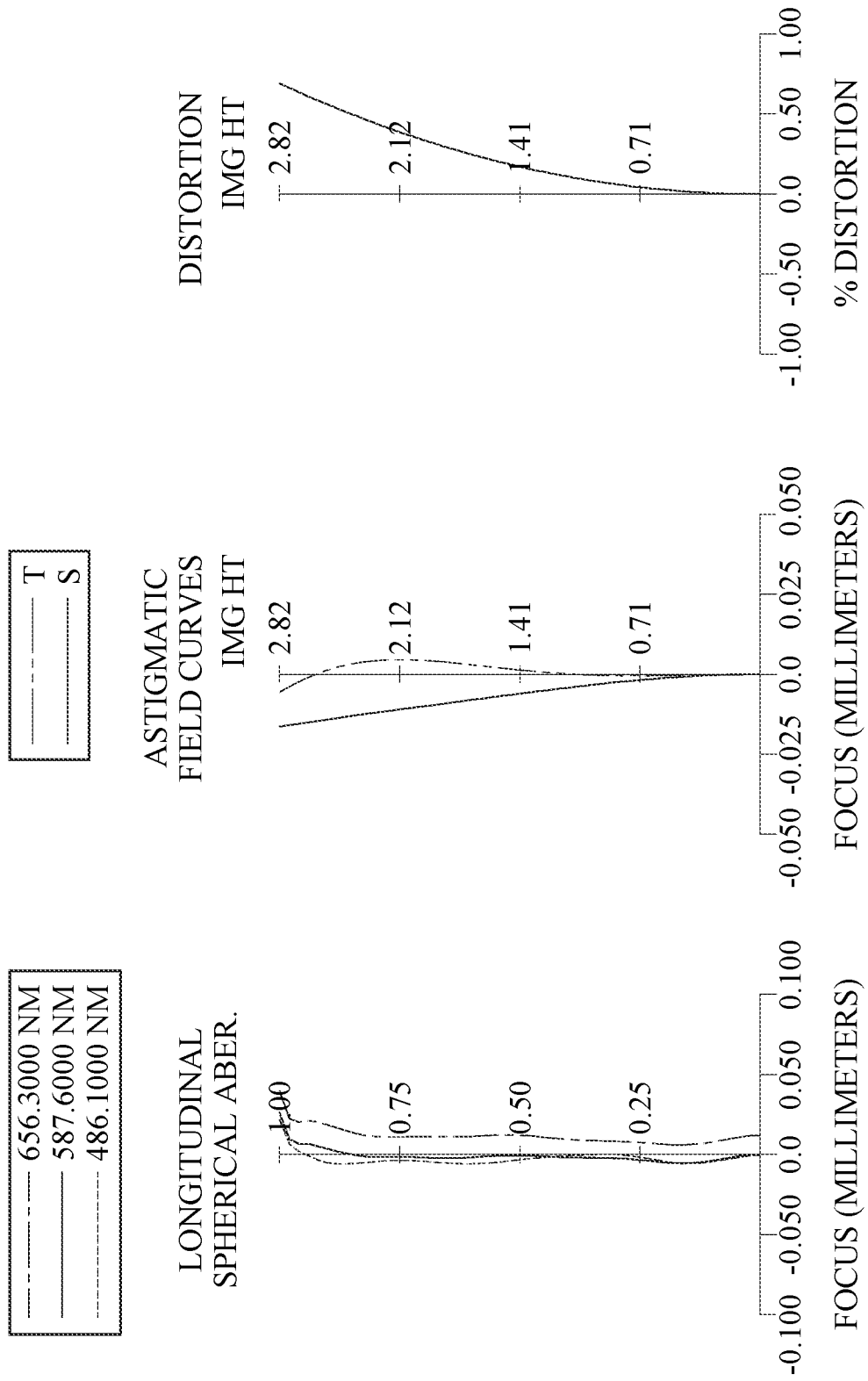
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The imaging system lens assembly includes four lens elements (E1, E2, E3 and E4) with no additional lens element disposed between each of the adjacent four lens elements. There is an air gap in a paraxial region between each of all adjacent lens elements among the first lens element E1 through the fourth lens element E4.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The reflective element E5 is made of glass material and located between the fourth lens element E4 and the image surface IMG, and will not affect the focal length of the imaging system lens assembly. The reflective element E5 is a prism which can provide optical path folding function. For the purpose of illustration, the optical path folding effect caused by the reflective element E5 is omitted in FIG. 1.

Figure 3:
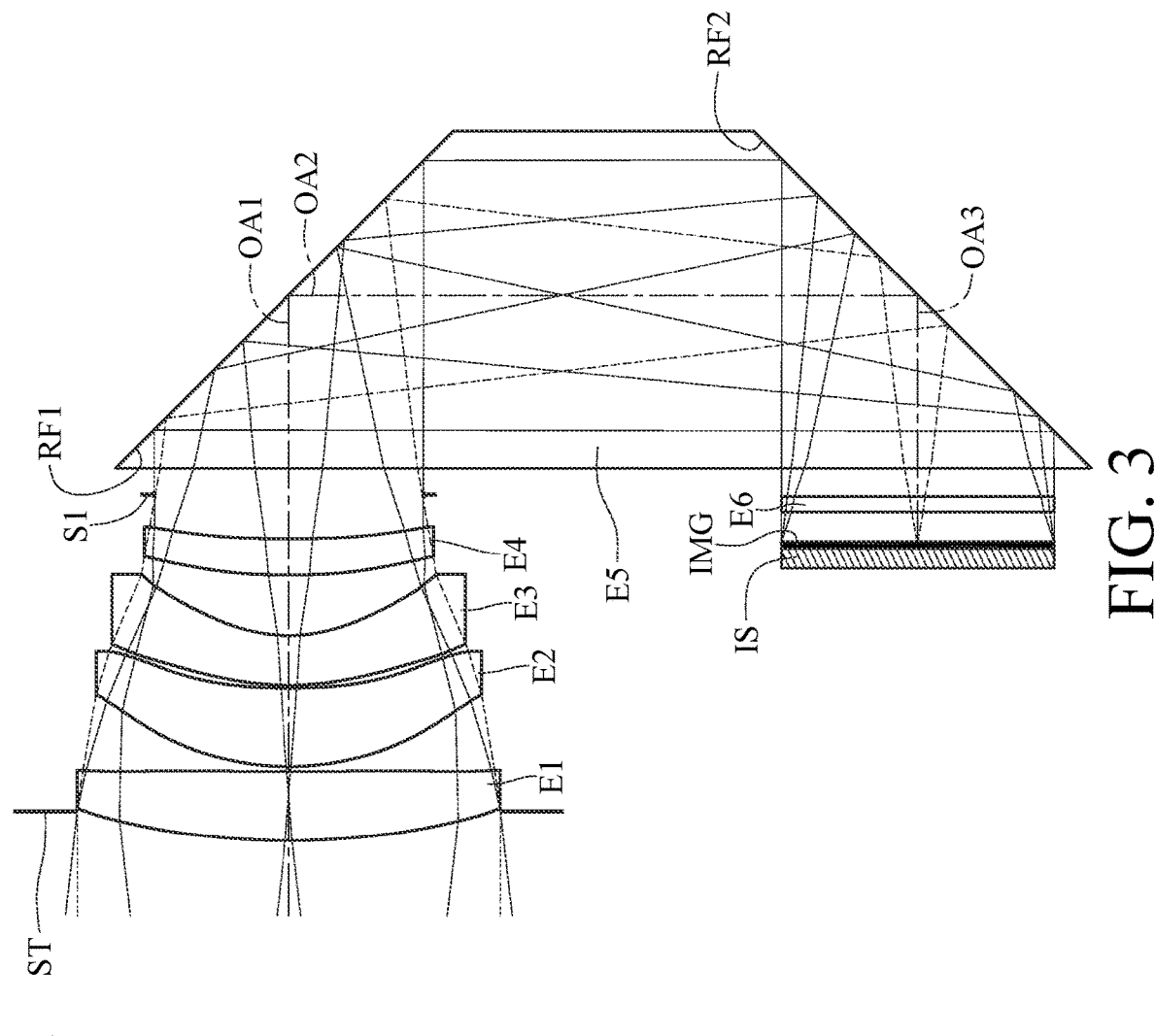
FIG. 3 is a schematic view of a configuration including a reflective element in the imaging system lens assembly of FIG. 1.
Figure 4:
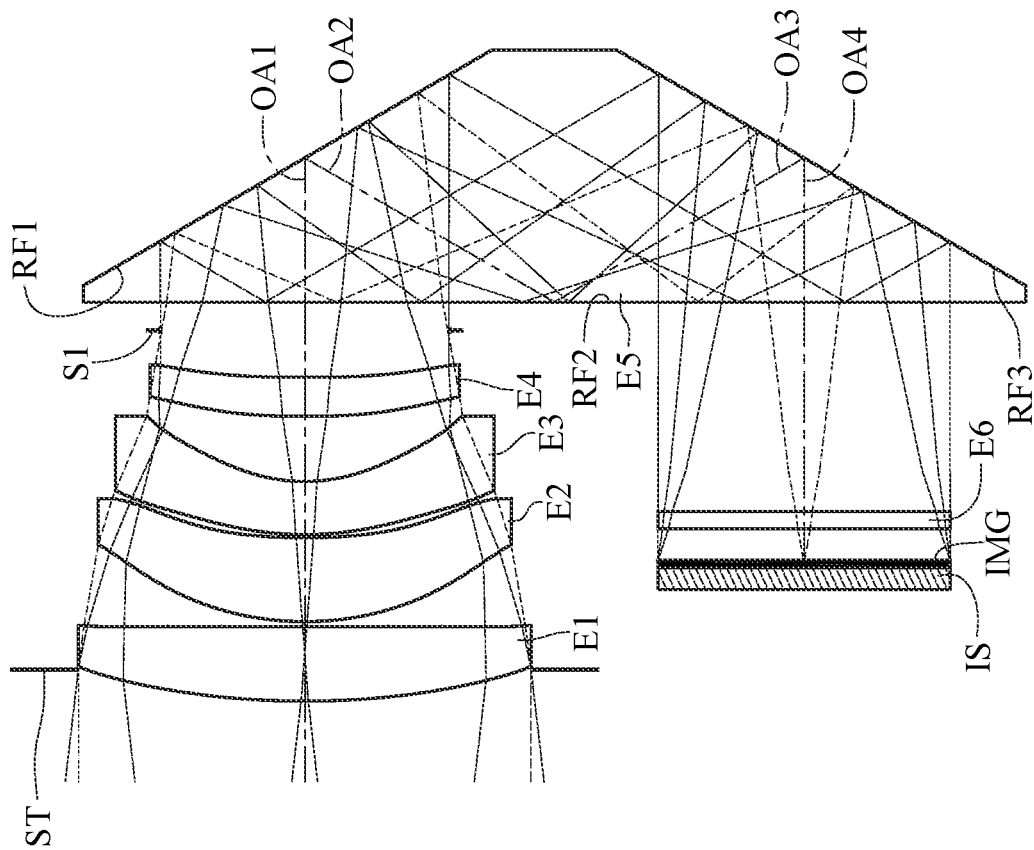
FIG. 4 is a schematic view of a configuration including another reflective element in the imaging system lens assembly of FIG. 1.
Figure 5:
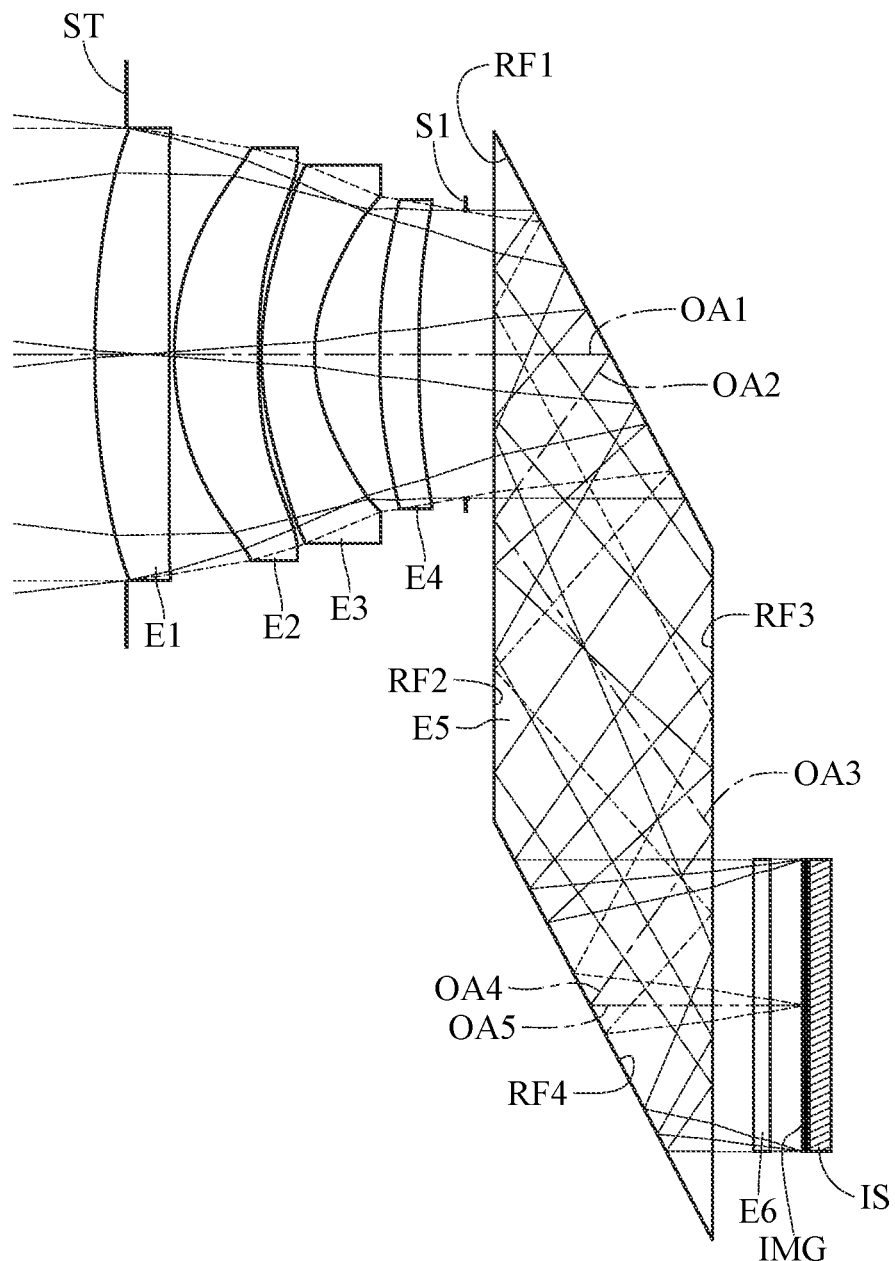
FIG. 5 is a schematic view of a configuration including still another reflective element in the imaging system lens assembly of FIG. 1.

FIG. 3 shows a schematic view of a configuration including a reflective element in the imaging system lens assembly of FIG. 1, FIG. 4 shows a schematic view of a configuration including another reflective element in the imaging system lens assembly of FIG. 1, and FIG. 5 shows a schematic view of a configuration including still another reflective element in the imaging system lens assembly of FIG. 1. In FIG. 3, the reflective element E5 has two reflective surfaces RF1 and RF2. An optical path can enter the reflective element E5 along a first optical axis OA1, deflect off the reflective surface RF1, reach the reflective surface RF2 along a second optical axis OA2, deflect off the reflective surface RF2, and then extend onto the image surface IMG along a third optical axis OA3.

In FIG. 4, the reflective element E5 has three reflective surfaces RF1, RF2 and RF3. An optical path can enter the reflective element E5 along a first optical axis OA1, deflect off the reflective surface RF1, reach the reflective surface RF2 along a second optical axis OA2, deflect off the reflective surface RF2, reach the reflective surface RF3 along a third optical axis OA3, deflect off the reflective surface RF3, and then extend onto the image surface IMG along a fourth optical axis OA4.

In FIG. 5, the reflective element E5 has four reflective surfaces RF1, RF2, RF3 and RF4. An optical path can enter the reflective element E5 along a first optical axis OA1, deflect off the reflective surface RF1, reach the reflective surface RF2 along a second optical axis OA2, deflect off the reflective surface RF2, reach the reflective surface RF3 along a third optical axis OA3, deflect off the reflective surface RF3, reach the reflective surface RF4 along a fourth optical axis OA4, deflect off the reflective surface RF4, and then extend onto the image surface IMG along a fifth optical axis OA5.

The filter E6 is made of glass material and located between the fourth lens element E4 and the image surface IMG, and will not affect the focal length of the imaging system lens assembly. The image sensor IS is disposed on or near the image surface IMG of the imaging system lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20 and 22.

In the imaging system lens assembly of the image capturing unit 1 according to the 1st embodiment, when a focal length of the imaging system lens assembly is f, an f-number of the imaging system lens assembly is Fno, and half of a maximum field of view of the imaging system lens assembly is HFOV, these parameters have the following values: f=15.83 millimeters (mm), Fno=2.80, and HFOV=10.0 degrees (deg.).

When an axial distance between the object-side surface of the first lens element E1 and the image-side surface of the fourth lens element E4 is TD, and an axial distance between the image-side surface of the fourth lens element E4 and the image surface IMG is BL, the following condition is satisfied: TD/BL=0.27.

When an axial distance between the object-side surface of the first lens element E1 and the image surface IMG is TL, and a maximum image height of the imaging system lens assembly is ImgH, the following condition is satisfied: TL/ImgH=6.74.

When the axial distance between the image-side surface of the fourth lens element E4 and the image surface IMG is BL, and the focal length of the imaging system lens assembly is f, the following condition is satisfied: BL/f=0.95.

When the axial distance between the image-side surface of the fourth lens element E4 and the image surface IMG is BL, and the maximum image height of the imaging system lens assembly is ImgH, the following condition is satisfied: BL/ImgH=5.31.

When a focal length of the first lens element E1 is f1, and a focal length of the second lens element E2 is f2, the following condition is satisfied: f1/f2=1.67.

When the focal length of the second lens element E2 is f2, and a focal length of the fourth lens element E4 is f4, the following condition is satisfied: f2/f4=0.28.

When the focal length of the imaging system lens assembly is f, the focal length of the second lens element E2 is f2, and a focal length of the third lens element E3 is f3, the following condition is satisfied: f/(|f2|+|f3|)=0.75.

When the focal length of the second lens element E2 is f2, and a composite focal length of the second lens element E2 and the third lens element E3 is f23, the following condition is satisfied: f2/f23=−0.17.

When the focal length of the second lens element E2 is f2, and a curvature radius of the object-side surface of the first lens element E1 is R1, the following condition is satisfied: f2/R1=1.18.

When the focal length of the second lens element E2 is f2, and a curvature radius of the image-side surface of the second lens element E2 is R4, the following condition is satisfied: f2/R4=1.65.

When the focal length of the imaging system lens assembly is f, a curvature radius of the object-side surface of the fourth lens element E4 is R7, and a curvature radius of the image-side surface of the fourth lens element E4 is R8, the following condition is satisfied: f/(R7+R8)=0.43.

When the curvature radius of the image-side surface of the second lens element E2 is R4, and a curvature radius of the object-side surface of the third lens element E3 is R5, the following condition is satisfied: R4/R5=1.85.

When the curvature radius of the object-side surface of the third lens element E3 is R5, and the curvature radius of the object-side surface of the fourth lens element E4 is R7, the following condition is satisfied: (R5+R7)/(R5−R7)=−1.99.

When the curvature radius of the image-side surface of the second lens element E2 is R4, and the curvature radius of the image-side surface of the fourth lens element E4 is R8, the following condition is satisfied: (R4+R8)/(R4−R8)=−1.89.

When the curvature radius of the object-side surface of the third lens element E3 is R5, a curvature radius of the image-side surface of the third lens element E3 is R6, the curvature radius of the object-side surface of the fourth lens element E4 is R7, and the curvature radius of the image-side surface of the fourth lens element E4 is R8, the following condition is satisfied: (|R5|+|R6|)/(|R7|+|R8|)=0.17.

When the axial distance between the object-side surface of the first lens element E1 and the image-side surface of the fourth lens element E4 is TD, a central thickness of the second lens element E2 is CT2, and a central thickness of the third lens element E3 is CT3, the following condition is satisfied: TD/(CT2+CT3)=2.36.

When a central thickness of the first lens element E1 is CT1, and the central thickness of the third lens element E3 is CT3, the following condition is satisfied: CT1/CT3=1.40.

When the central thickness of the third lens element E3 is CT3, and an axial distance between the third lens element E3 and the fourth lens element E4 is T34, the following condition is satisfied: CT3/T34=0.82. In this embodiment, an axial distance between two adjacent lens elements is a distance in a paraxial region between two adjacent lens surfaces of the two adjacent lens elements.

When the axial distance between the third lens element E3 and the fourth lens element E4 is T34, and a central thickness of the fourth lens element E4 is CT4, the following condition is satisfied: T34/CT4=1.66.

When the central thickness of the second lens element E2 is CT2, the central thickness of the third lens element E3 is CT3, and a sum of axial distances between each of all adjacent lens elements of the imaging system lens assembly is ΣAT, the following condition is satisfied: (CT2+CT3)/ΣAT=1.86. In this embodiment, ΣAT is equal to a sum of an axial distance between the first lens element E1 and the second lens element, an axial distance between the second lens element E2 and the third lens element E3, and the axial distance between the third lens element E3 and the fourth lens element E4.

When a sum of central thicknesses of all lens elements of the imaging system lens assembly is ΣCT, and the sum of axial distances between each of all adjacent lens elements of the imaging system lens assembly is ΣAT, the following condition is satisfied: ΣCT/ΣAT=3.41. In this embodiment, ΣCT is equal to a sum of the central thickness of the first lens element E1, the central thickness of the second lens element E2, the central thickness of the third lens element E3, and the central thickness of the fourth lens element E4.

When an Abbe number of the first lens element E1 is V1, and an Abbe number of the second lens element E2 is V2, the following condition is satisfied: |V1−V2|=0.0.

When the Abbe number of the first lens element E1 is V1, and an Abbe number of the third lens element E3 is V3, the following condition is satisfied: V1−V3=30.4.

When the Abbe number of the first lens element E1 is V1, the Abbe number of the second lens element E2 is V2, and the Abbe number of the third lens element E3 is V3, the following condition is satisfied: (V2+V3)−V1=25.6.

When the Abbe number of the first lens element E1 is V1, and a refractive index of the first lens element E1 is N1, the following condition is satisfied: V1/N1=35.7.

When a displacement in parallel with the optical axis from an axial vertex of the image-side surface of the second lens element E2 to a maximum effective radius position of the image-side surface of the second lens element E2 is Sag2R2, and the central thickness of the second lens element E2 is CT2, the following condition is satisfied: Sag2R2/CT2=0.47. In this embodiment, the direction of Sag2R2 faces towards the image side of the imaging system lens assembly, so the value of Sag2R2 is positive.

When a displacement in parallel with the optical axis from an axial vertex of the image-side surface of the third lens element E3 to a maximum effective radius position of the image-side surface of the third lens element E3 is Sag3R2, and the central thickness of the third lens element E3 is CT3, the following condition is satisfied: Sag3R2/CT3=1.24. In this embodiment, the direction of Sag3R2 faces towards the image side of the imaging system lens assembly, so the value of Sag3R2 is positive.

When a maximum effective radius of the object-side surface of the first lens element E1 is Y1R1, and a maximum effective radius of the image-side surface of the fourth lens element E4 is Y4R2, the following condition is satisfied: Y4R2/Y1R1=0.66.

When a vertical distance between an inflection point on the object-side surface of the second lens element E2 and the optical axis is YI2R1, and a maximum effective radius of the object-side surface of the second lens element E2 is Y2R1, the following condition is satisfied: YI2R1/Y2R1=0.87.

The detailed optical data of the 1st embodiment are shown in Table 1A and the aspheric surface data are shown in Table 1B below.

TABLE 1A

1st Embodiment
f = 15.83 mm, Fno = 2.80, HFOV = 10.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.394 | | | | |
| 2 | Lens 1 | 10.4972 (ASP) | 0.929 | Glass | 1.569 | 56.0 | 20.78 |
| 3 | | 90.9091 (ASP) | 0.065 | | | | |
| 4 | Lens 2 | 3.7285 (ASP) | 1.048 | Plastic | 1.544 | 56.0 | 12.41 |
| 5 | | 7.5031 (ASP) | 0.040 | | | | |
| 6 | Lens 3 | 4.0518 (ASP) | 0.664 | Plastic | 1.614 | 25.6 | −8.68 |
| 7 | | 2.1575 (ASP) | 0.813 | | | | |
| 8 | Lens 4 | 12.2579 (ASP) | 0.489 | Plastic | 1.544 | 56.0 | 44.76 |
| 9 | | 24.3371 (ASP) | 0.590 | | | | |
| 10 | Stop | Plano | 0.352 | | | | |
| 11 | Prism | Plano | 12.912 | Glass | 1.516 | 64.1 | — |
| 12 | | Plano | 0.510 | | | | |

TABLE 1A-continued

1st Embodiment
f = 15.83 mm, Fno = 2.80, HFOV = 10.0 deg.

| Surface # | | Curvature Radius | Thickness | Material | Index | Abbe # | Focal Length |
|---|---|---|---|---|---|---|---|
| 13 | Filter | Plano | 0.210 | Glass | 1.516 | 64.1 | — |
| 14 | | Plano | 0.398 | | | | |
| 15 | Image | Plano | — | | | | |

Note:
Reference wavelength is 587.6 nm (d-line).
An effective radius of the stop S1 (Surface 10) is 1.80 mm.

TABLE 1B

| Aspheric Coefficients | | | | |
|---|---|---|---|---|
| Surface # | 2 | 3 | 4 | 5 |
| k = | 1.476340E+00 | −9.900000E+01 | −1.535430E+00 | 2.547400E−01 |
| A4 = | 3.115821E−04 | −1.528952E−03 | 3.041900E−03 | 8.510634E−03 |
| A6 = | −2.925622E−05 | 9.290574E−06 | 5.069867E−04 | −2.180701E−03 |
| A8 = | −2.709218E−06 | 1.408208E−05 | 3.550884E−04 | 8.367125E−03 |
| A10 = | 1.221600E−06 | 4.753148E−07 | −2.349024E−04 | −7.532903E−03 |
| A12 = | — | — | 5.683658E−05 | 3.372925E−03 |
| A14 = | — | — | −6.824818E−06 | −9.154304E−04 |
| A16 = | — | — | 3.163250E−07 | 1.578135E−04 |
| A18 = | — | — | — | −1.697743E−05 |
| A20 = | — | — | — | 1.040824E−06 |
| A22 = | — | — | — | −2.765024E−08 |
| Surface # | 6 | 7 | 8 | 9 |
| k = | −2.002770E+00 | 0.000000E+00 | 0.000000E+00 | 0.000000E+00 |
| A4 = | 2.369503E−03 | −4.890050E−03 | 2.769041E−02 | 1.866393E−02 |
| A6 = | −7.752955E−03 | −1.148639E−02 | −4.398798E−03 | −7.385457E−04 |
| A8 = | 7.831378E−03 | −6.437476E−03 | −9.424420E−03 | −7.986780E−03 |
| A10 = | −5.850790E−03 | 1.038762E−02 | 9.555224E−03 | 7.721632E−03 |
| A12 = | 2.619016E−03 | −6.477121E−03 | −4.855571E−03 | −3.846695E−03 |
| A14 = | −7.087547E−04 | 2.441265E−03 | 1.479430E−03 | 1.092700E−03 |
| A16 = | 1.182648E−04 | −5.769203E−04 | −2.750545E−04 | −1.718324E−04 |
| A18 = | −1.174892E−05 | 7.910450E−05 | 3.005749E−05 | 1.323082E−05 |
| A20 = | 6.130382E−07 | −4.836227E−06 | −1.566906E−06 | −3.579221E−07 |
| A22 = | −1.169583E−08 | — | — | — |

In Table 1A, the curvature radius, the thickness and the focal length are shown in millimeters (mm). Surface numbers 0-15 represent the surfaces sequentially arranged from the object side to the image side along the optical axis. In Table 1B, k represents the conic coefficient of the equation of the aspheric surface profiles. A4-A22 represent the aspheric coefficients ranging from the 4th order to the 28th order.

The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 6:
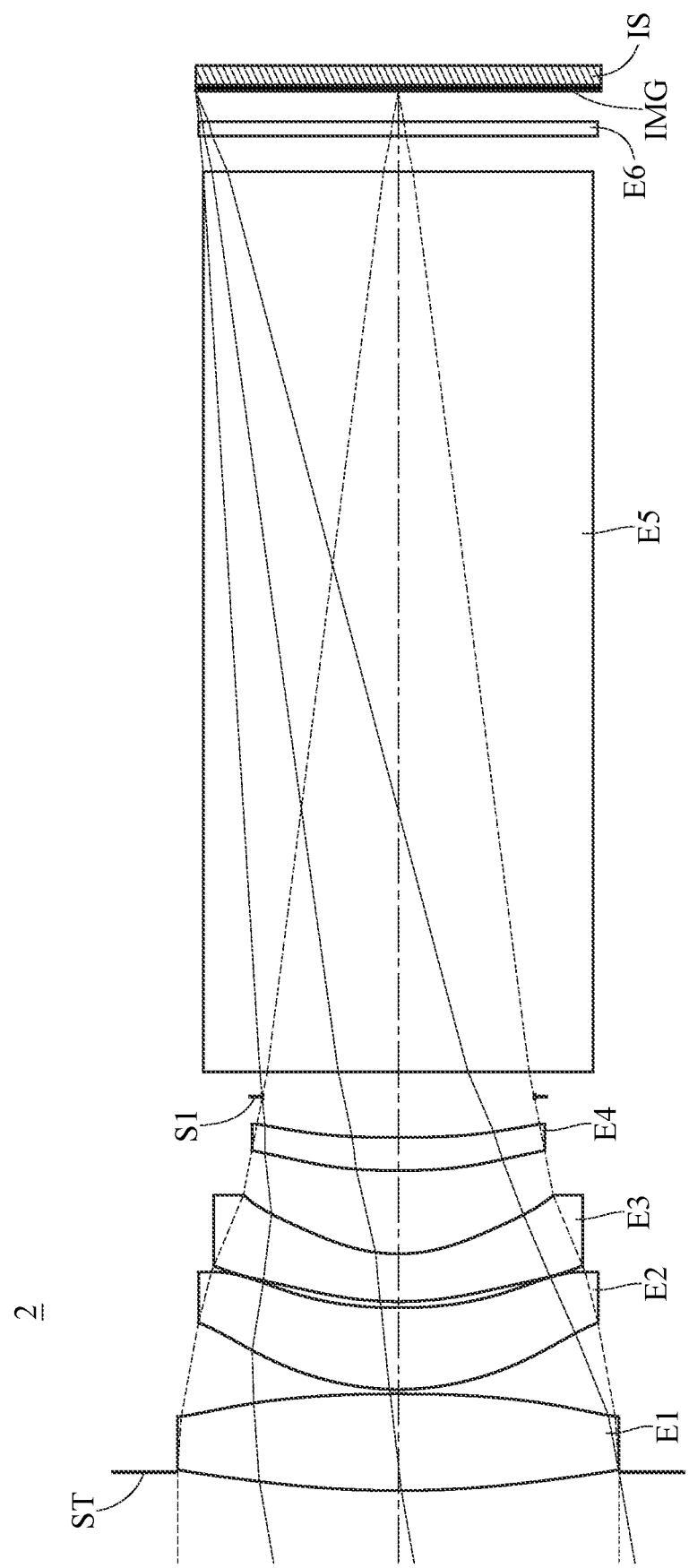
FIG. 6 is a schematic view of an image capturing unit according to the 2nd embodiment of the present disclosure.
Figure 7:
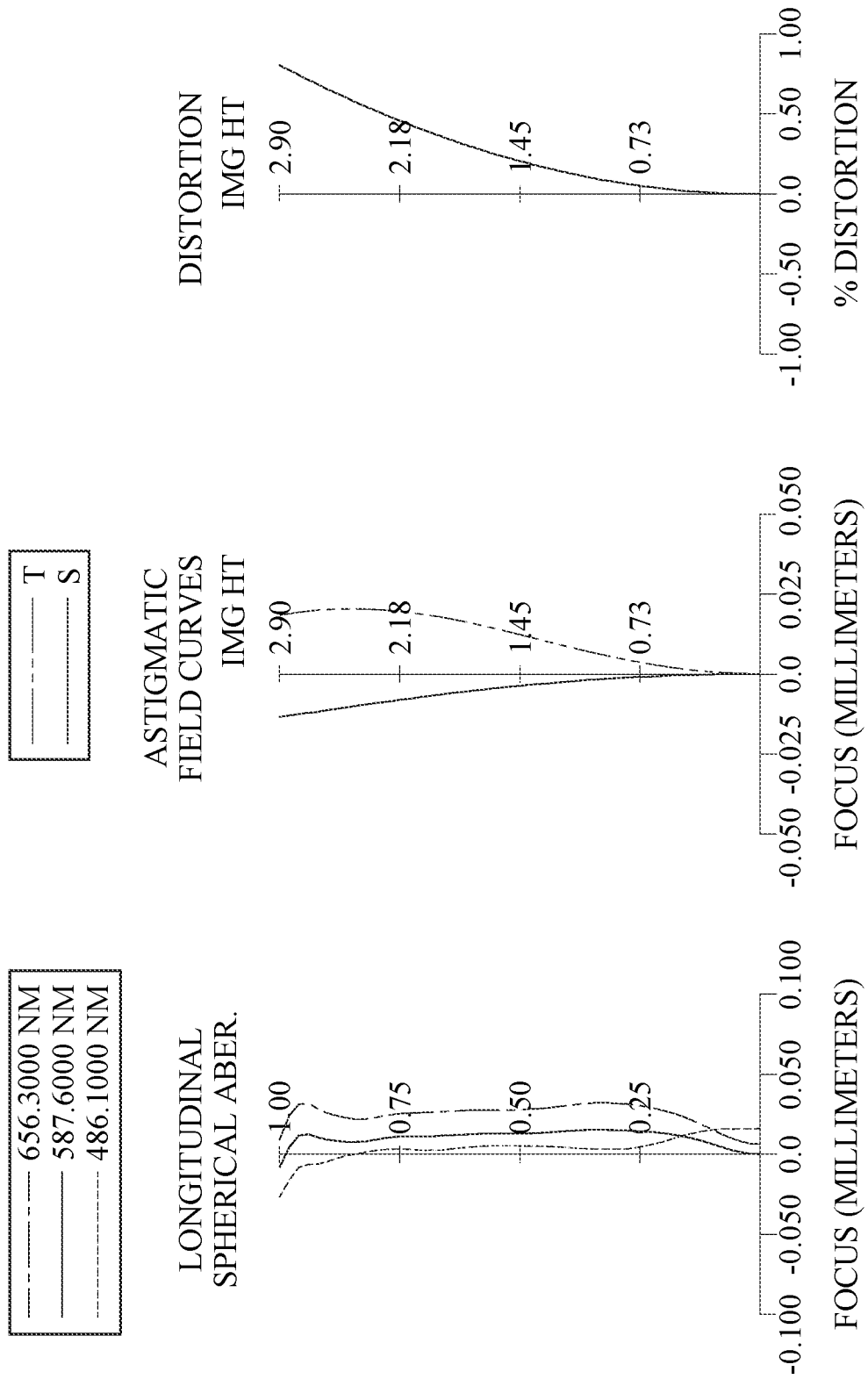
FIG. 7 shows spherical aberration curves, astigmatic field curves and a distortion curve of the image capturing unit according to the 2nd embodiment.

FIG. 6 is a schematic view of an image capturing unit according to the 2nd embodiment of the present disclosure. FIG. 7 shows, in order from left to right, spherical aberration curves, astigmatic field curves and a distortion curve of the image capturing unit according to the 2nd embodiment. In FIG. 6, the image capturing unit 2 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The imaging system lens assembly includes four lens elements (E1, E2, E3 and E4) with no additional lens element disposed between each of the adjacent four lens elements. There is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The reflective element E5 is made of glass material and located between the fourth lens element E4 and the image surface IMG, and will not affect the focal length of the imaging system lens assembly. The reflective element E5 is a prism which can provide optical path folding function. For the purpose of illustration, the optical path folding caused by the reflective element E5 is omitted in FIG. 6.

The filter E6 is made of glass material and located between the fourth lens element E4 and the image surface IMG, and will not affect the focal length of the imaging system lens assembly. The image sensor IS is disposed on or near the image surface IMG of the imaging system lens assembly.

The detailed optical data of the 2nd embodiment are shown in Table 2A and the aspheric surface data are shown in Table 2B below.

TABLE 2A

2nd Embodiment
f = 16.32 mm, Fno = 2.58, HFOV = 10.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.261 | | | | |
| 2 | Lens 1 | 15.0695 | (ASP) | 1.388 | Glass | 1.517 | 64.2 | 17.08 |
| 3 | | −20.6539 | (ASP) | 0.065 | | | | |
| 4 | Lens 2 | 3.9716 | (ASP) | 1.169 | Plastic | 1.544 | 56.0 | 14.71 |
| 5 | | 7.0671 | (ASP) | 0.090 | | | | |
| 6 | Lens 3 | 5.5093 | (ASP) | 0.685 | Plastic | 1.587 | 28.3 | −8.05 |
| 7 | | 2.4269 | (ASP) | 1.194 | | | | |
| 8 | Lens 4 | 10.3443 | (ASP) | 0.476 | Plastic | 1.544 | 56.0 | 32.39 |
| 9 | | 24.6416 | (ASP) | 0.590 | | | | |
| 10 | Stop | Plano | | 0.352 | | | | |
| 11 | Prism | Plano | | 12.912 | Glass | 1.516 | 64.1 | — |
| 12 | | Plano | | 0.510 | | | | |
| 13 | Filter | Plano | | 0.210 | Glass | 1.516 | 64.1 | — |
| 14 | | Plano | | 0.435 | | | | |
| 15 | Image | Plano | | — | | | | |

Note:
Reference wavelength is 587.6 nm (d-line).
An effective radius of the stop S1 (Surface 10) is 1.95 mm.

TABLE 2B

Aspheric Coefficients

| Surface # | 2 | 3 | 4 | 5 |
|---|---|---|---|---|
| k = | 6.672590E+00 | 1.461290E+01 | −2.714590E+00 | −1.356410E+00 |
| A4 = | 1.793497E−04 | −1.421548E−03 | 2.928751E−03 | 2.922826E−02 |
| A6 = | −1.506447E−04 | −1.502244E−05 | 1.997482E−04 | −2.426321E−02 |
| A8 = | −4.060574E−08 | 3.460925E−06 | −5.224863E−05 | 1.474054E−02 |
| A10 = | 6.850996E−07 | 6.260452E−07 | 2.286471E−05 | −5.742734E−03 |
| A12 = | — | — | −6.556491E−06 | 1.489864E−03 |
| A14 = | — | — | 6.198951E−07 | −2.735211E−04 |
| A16 = | — | — | −1.879197E−08 | 3.552207E−05 |
| A18 = | — | — | — | −3.070094E−06 |
| A20 = | — | — | — | 1.552949E−07 |
| A22 = | — | — | — | −3.407528E−09 |

| Surface # | 6 | 7 | 8 | 9 |
|---|---|---|---|---|
| k = | −1.582780E+00 | 0.000000E+00 | 0.000000E+00 | 0.000000E+00 |
| A4 = | 2.790666E−02 | 5.641509E−04 | 2.183794E−02 | 1.775390E−02 |
| A6 = | −3.205676E−02 | −1.819255E−02 | −5.724060E−03 | −2.899173E−03 |
| A8 = | 1.777836E−02 | 7.485294E−03 | 2.551878E−04 | −3.426986E−04 |
| A10 = | −6.393555E−03 | −2.503778E−03 | 3.420866E−04 | 4.704180E−04 |
| A12 = | 1.443132E−03 | 5.249888E−04 | −4.456056E−04 | −4.451055E−04 |
| A14 = | −1.805665E−04 | −9.816645E−06 | 2.261572E−04 | 2.189879E−04 |
| A16 = | 6.601817E−06 | −2.114512E−05 | −5.514973E−05 | −5.491709E−05 |
| A18 = | 1.236821E−06 | 4.229622E−06 | 6.708840E−06 | 6.979302E−06 |
| A20 = | −1.684395E−07 | −2.721602E−07 | −3.340838E−07 | −3.640456E−07 |
| A22 = | 6.489548E−09 | — | — | — |

In the 2nd embodiment, the equation of the aspheric surface profiles of the aforementioned lens elements is the same as the equation of the 1st embodiment. Also, the definitions of these parameters shown in Table 20 below are the same as those stated in the 1st embodiment with corresponding values for the 2nd embodiment, so an explanation in this regard will not be provided again.

Moreover, these parameters can be calculated from Table 2A and Table 2B3 as the following values and satisfy the following conditions:

TABLE 2C

Values of Conditional Expressions

| | | | |
|---|---|---|---|
| f [mm] | 16.32 | (R4 + R8)/(R4 − R8) | −1.80 |
| Fno | 2.58 | (|R5| + |R6|)/(|R7| + |R8|) | 0.23 |
| HFOV [deg.] | 10.0 | TD/(CT2 + CT3) | 2.73 |
| TD/BL | 0.34 | CT1/CT3 | 2.03 |
| TL/ImgH | 6.92 | CT3/T34 | 0.57 |
| BL/f | 0.92 | T34/CT4 | 2.51 |
| BL/ImgH | 5.18 | (CT2 + CT3)/ΣAT | 1.37 |
| f1/f2 | 1.16 | ΣCT/ΣAT | 2.76 |
| f2/f4 | 0.45 | |V1 − V2| | 8.2 |
| f/(|f2| + |f3|) | 0.72 | V1 − V3 | 35.9 |
| f2/f23 | −0.52 | (V2 + V3) − V1 | 20.1 |
| f2/R1 | 0.98 | V1/N1 | 42.3 |
| f2/R4 | 2.08 | Sag2R2/CT2 | 0.44 |
| f/(R7 + R8) | 0.47 | Sag3R2/CT3 | 1.23 |
| R4/R5 | 1.28 | Y4R2/Y1R1 | 0.64 |
| (R5 + R7)/(R5 − R7) | −3.28 | YI2R1/Y2R1 | 0.81 |

3rd Embodiment

Figure 8:
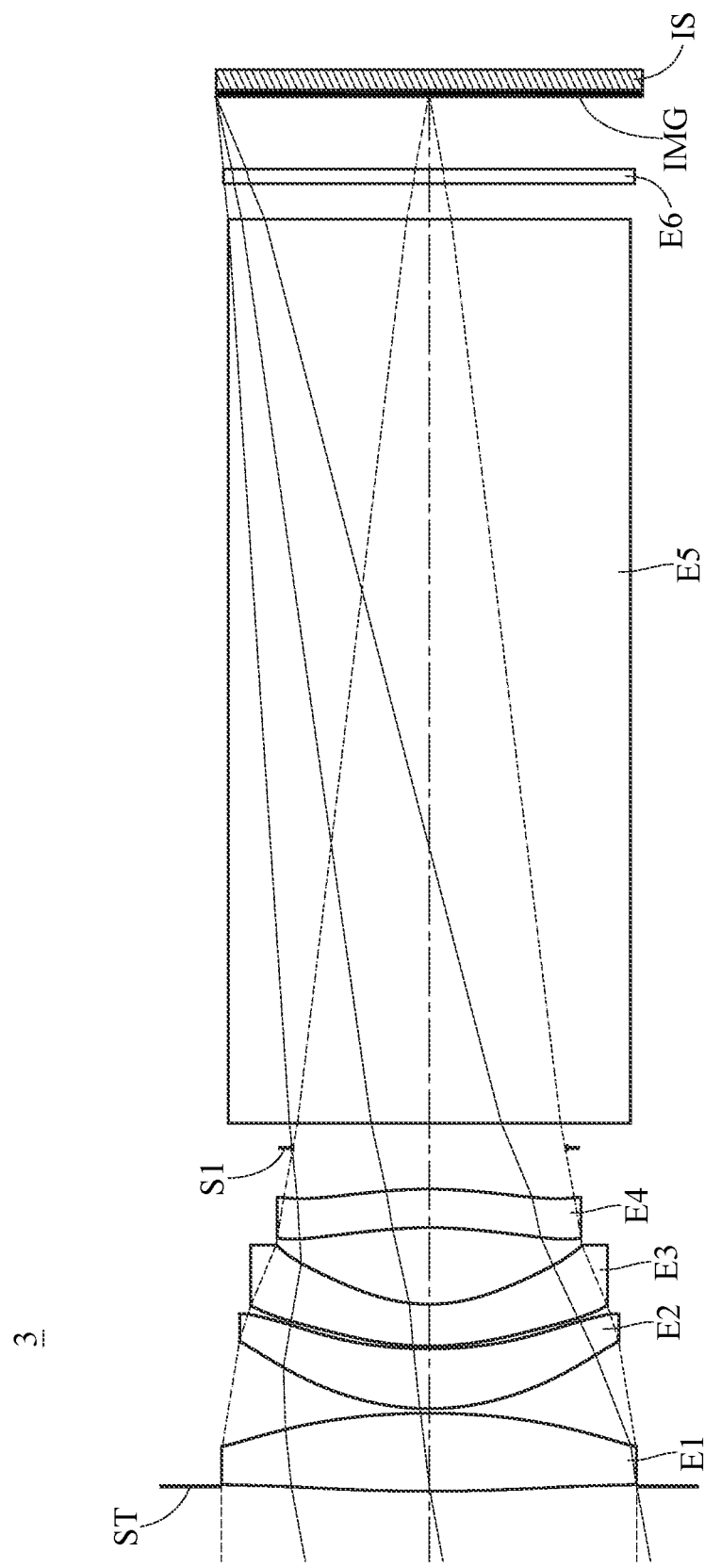
FIG. 8 is a schematic view of an image capturing unit according to the 3rd embodiment of the present disclosure.
Figure 9:
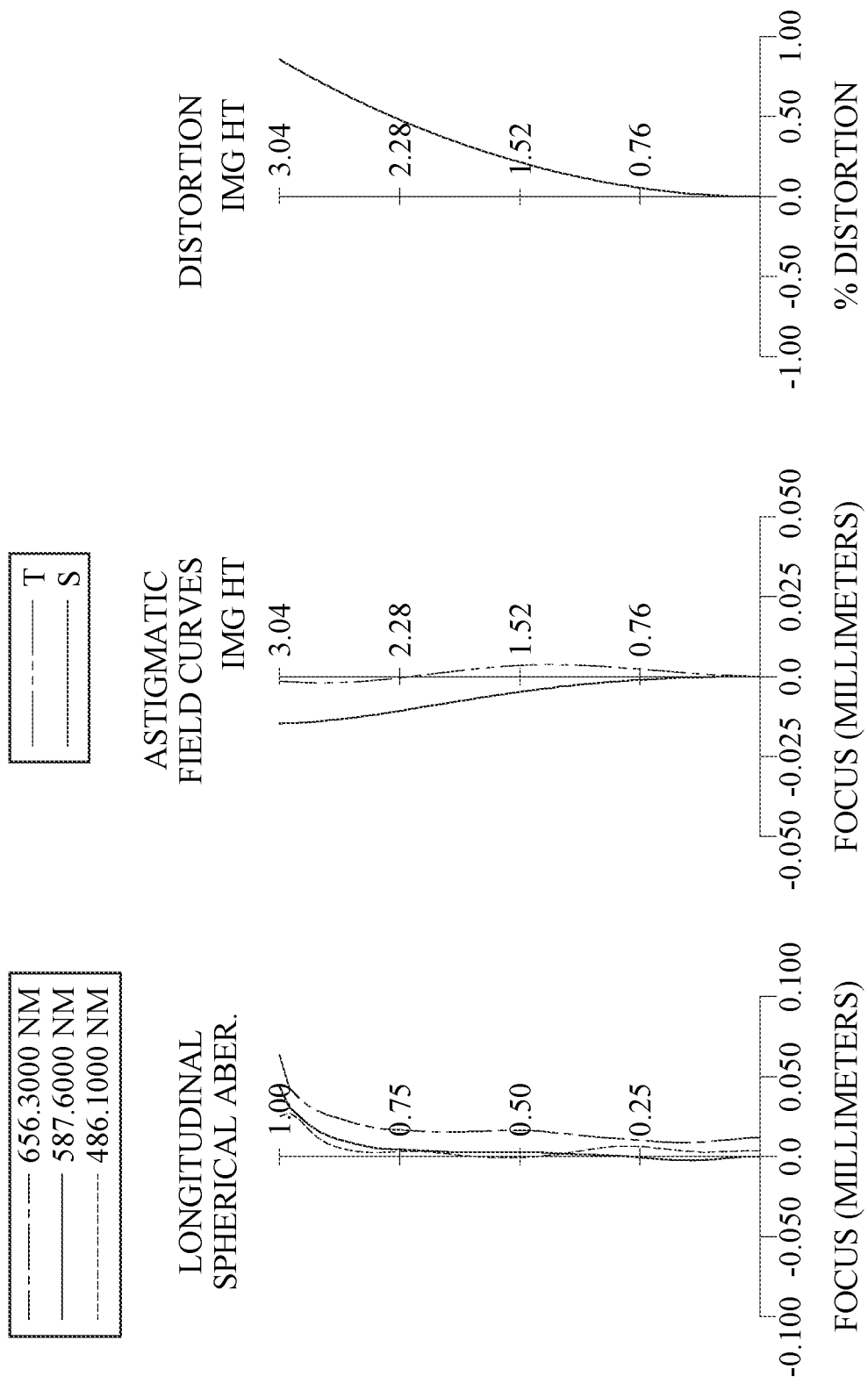
FIG. 9 shows spherical aberration curves, astigmatic field curves and a distortion curve of the image capturing unit according to the 3rd embodiment.

FIG. 8 is a schematic view of an image capturing unit according to the 3rd embodiment of the present disclosure. FIG. 9 shows, in order from left to right, spherical aberration curves, astigmatic field curves and a distortion curve of the image capturing unit according to the 3rd embodiment. In FIG. 8, the image capturing unit 3 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The imaging system lens assembly includes four lens elements (E1, E2, E3 and E4) with no additional lens element disposed between each of the adjacent four lens elements. There is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric.

The reflective element E5 is made of glass material and located between the fourth lens element E4 and the image surface IMG, and will not affect the focal length of the imaging system lens assembly. The reflective element E5 is a prism which can provide optical path folding function. For the purpose of illustration, the optical path folding caused by the reflective element E5 is omitted in FIG. 8.

The filter E6 is made of glass material and located between the fourth lens element E4 and the image surface IMG, and will not affect the focal length of the imaging system lens assembly. The image sensor IS is disposed on or near the image surface IMG of the imaging system lens assembly.

The detailed optical data of the 3rd embodiment are shown in Table 3A and the aspheric surface data are shown in Table 3B below.

TABLE 3A

3rd Embodiment
f = 16.22 mm, Fno = 2.74, HFOV = 10.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.072 | | | | |
| 2 | Lens 1 | 26.3932 (ASP) | 1.114 | Glass | 1.523 | 58.7 | 14.31 |
| 3 | | −10.2954 (ASP) | 0.065 | | | | |
| 4 | Lens 2 | 3.6678 (ASP) | 0.855 | Plastic | 1.544 | 56.0 | 14.47 |
| 5 | | 6.3019 (ASP) | 0.040 | | | | |
| 6 | Lens 3 | 4.3335 (ASP) | 0.597 | Plastic | 1.614 | 25.6 | −9.54 |
| 7 | | 2.3600 (ASP) | 1.094 | | | | |
| 8 | Lens 4 | −6.2436 (ASP) | 0.550 | Plastic | 1.544 | 56.0 | −523.42 |
| 9 | | −6.5817 (ASP) | 0.590 | | | | |
| 10 | Stop | Plano | 0.352 | | | | |
| 11 | Prism | Plano | 12.912 | Glass | 1.516 | 64.1 | — |
| 12 | | Plano | 0.510 | | | | |

TABLE 3A-continued

3rd Embodiment
f = 16.22 mm, Fno = 2.74, HFOV = 10.5 deg.

| Surface # | | Curvature Radius | Thickness | Material | Index | Abbe # | Focal Length |
|---|---|---|---|---|---|---|---|
| 13 | Filter | Plano | 0.210 | Glass | 1.516 | 64.1 | — |
| 14 | | Plano | 1.028 | | | | |
| 15 | Image | Plano | — | | | | |

Note:
Reference wavelength is 587.6 nm (d-line).
An effective radius of the stop S1 (Surface 10) is 1.96 mm.

TABLE 3B

| Aspheric Coefficients | | | | |
|---|---|---|---|---|
| Surface # | 2 | 3 | 4 | 5 |
| k = | 2.818940E+00 | 6.579610E+00 | −2.401870E+00 | −6.477160E+00 |
| A4 = | 2.929214E−04 | −1.031422E−03 | 2.733593E−03 | 4.996895E−03 |
| A6 = | −2.850258E−04 | 8.765930E−05 | 2.538302E−04 | 2.566433E−04 |
| A8 = | 3.790171E−06 | 9.364010E−06 | −8.395495E−05 | 3.714068E−03 |
| A10 = | 2.031667E−06 | −1.140518E−07 | 1.746961E−05 | −4.094841E−03 |
| A12 = | −6.424625E−08 | 4.492627E−08 | −1.050279E−06 | 1.955945E−03 |
| A14 = | — | — | −3.371264E−07 | −5.410232E−04 |
| A16 = | — | — | 3.355720E−08 | 9.256447E−05 |
| A18 = | — | — | — | −9.693053E−06 |
| A20 = | — | — | — | 5.710599E−07 |
| A22 = | — | — | — | −1.451980E−08 |
| Surface # | 6 | 7 | 8 | 9 |
| k = | −2.436170E+00 | 0.000000E+00 | 0.000000E+00 | 0.000000E+00 |
| A4 = | −4.477443E−03 | −1.711391E−02 | 1.562196E−02 | 1.255193E−02 |
| A6 = | −2.623532E−03 | −6.657428E−03 | −4.700573E−03 | −2.464441E−03 |
| A8 = | 6.947904E−03 | 6.291550E−03 | 4.004232E−03 | 2.577253E−03 |
| A10 = | −6.233023E−03 | −5.122007E−03 | −3.346470E−03 | −2.197389E−03 |
| A12 = | 2.873408E−03 | 2.418542E−03 | 1.711679E−03 | 1.209456E−03 |
| A14 = | −7.850280E−04 | −6.601520E−04 | −5.257172E−04 | −4.057290E−04 |
| A16 = | 1.336801E−04 | 1.027515E−04 | 9.759380E−05 | 8.234783E−05 |
| A18 = | −1.400453E−05 | −8.166246E−06 | −1.006214E−05 | −9.334252E−06 |
| A20 = | 8.281264E−07 | 2.279725E−07 | 4.391770E−07 | 4.516940E−07 |
| A22 = | −2.117086E−08 | — | — | — |

In the 3rd embodiment, the equation of the aspheric surface profiles of the aforementioned lens elements is the same as the equation of the 1st embodiment. Also, the definitions of these parameters shown in Table 30 below are the same as those stated in the 1st embodiment with corresponding values for the 3rd embodiment, so an explanation in this regard will not be provided again.

Moreover, these parameters can be calculated from Table 3A and Table 3B3 as the following values and satisfy the following conditions:

TABLE 3C

| Values of Conditional Expressions | | | |
|---|---|---|---|
| f [mm] | 16.22 | (R4 + R8)/(R4 − R8) | −0.02 |
| Fno | 2.74 | (\|R5\| + \|R6\|)/(\|R7\| + \|R8\|) | 0.52 |
| HFOV [deg.] | 10.5 | TD/(CT2 + CT3) | 2.97 |
| TD/BL | 0.28 | CT1/CT3 | 1.87 |
| TL/ImgH | 6.55 | CT3/T34 | 0.55 |
| BL/f | 0.96 | T34/CT4 | 1.99 |
| BL/ImgH | 5.13 | (CT2 + CT3)/ΣAT | 1.21 |
| f1/f2 | 0.99 | ΣCT/ΣAT | 2.60 |
| f2/f4 | −0.03 | \|V1 − V2\| | 2.7 |
| f/(\|f2\| + \|f3\|) | 0.68 | V1 − V3 | 33.1 |
| f2/f23 | −0.29 | (V2 + V3) − V1 | 22.9 |
| f2/R1 | 0.55 | V1/N1 | 38.5 |

TABLE 3C-continued

| Values of Conditional Expressions | | | |
|---|---|---|---|
| f2/R4 | 2.30 | Sag2R2/CT2 | 0.59 |
| f/(R7 + R8) | −1.26 | Sag3R2/CT3 | 1.42 |
| R4/R5 | 1.45 | Y4R2/Y1R1 | 0.70 |
| (R5 + R7)/(R5 − R7) | −0.18 | YI2R1/Y2R1 | 0.88; 0.98 |

4th Embodiment

Figure 10:
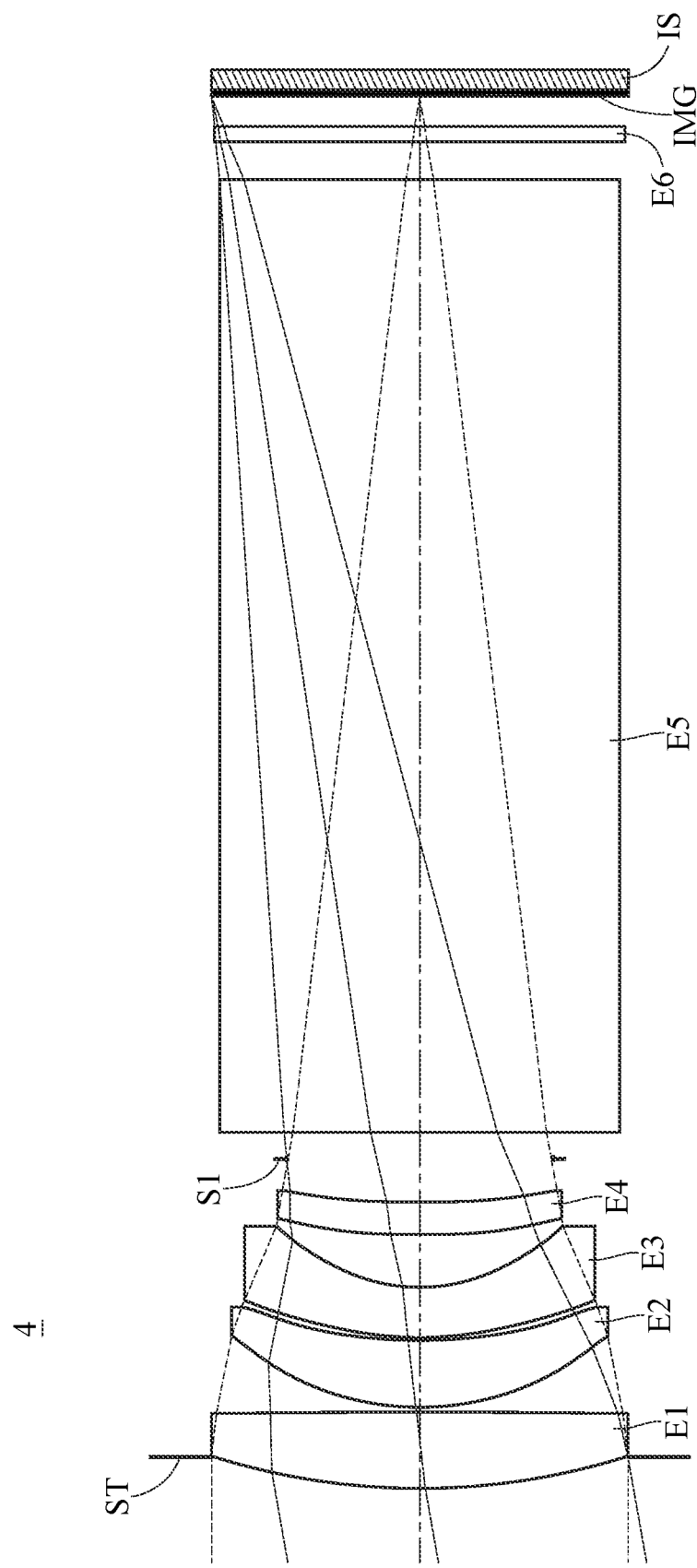
FIG. 10 is a schematic view of an image capturing unit according to the 4th embodiment of the present disclosure.
Figure 11:
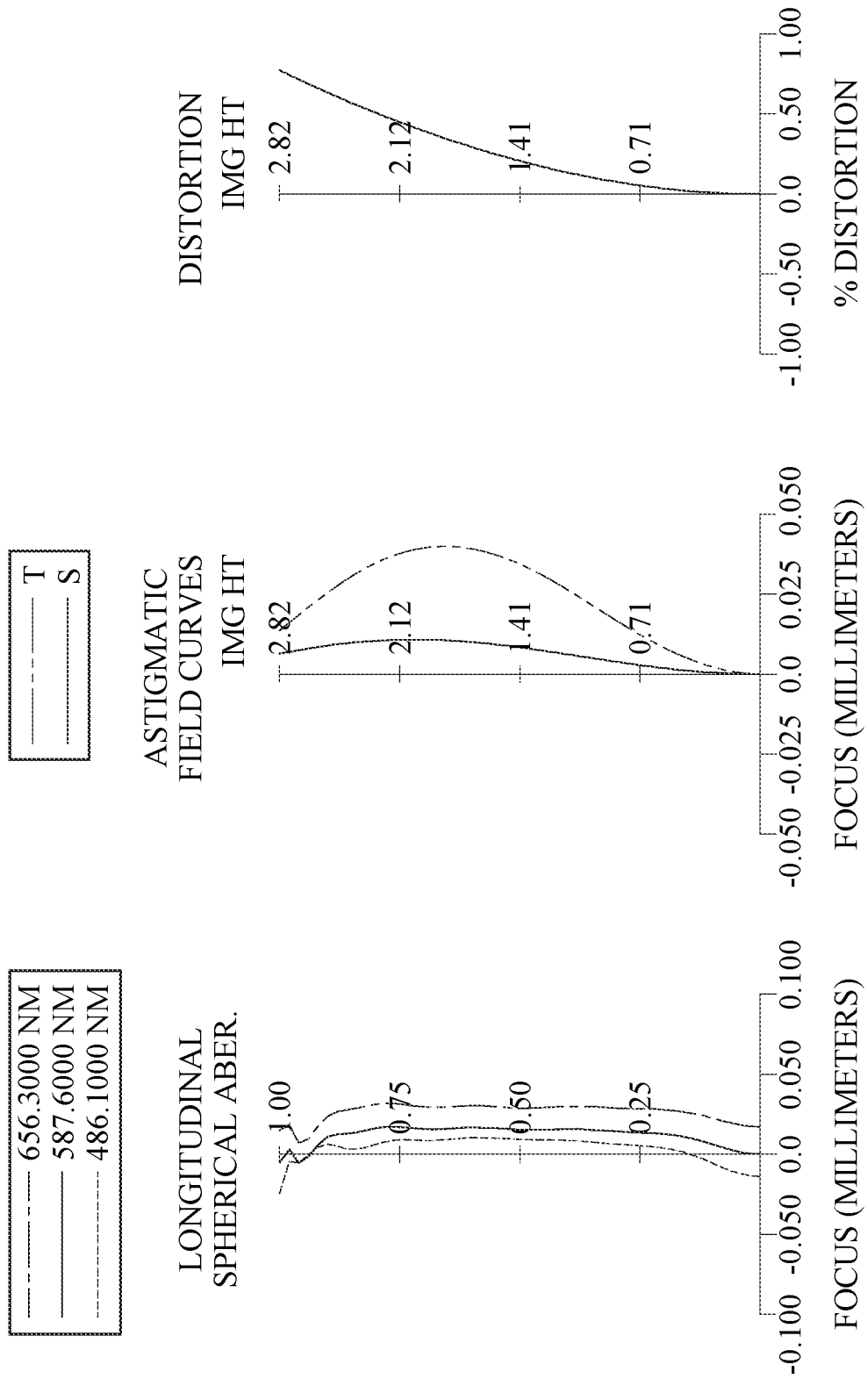
FIG. 11 shows spherical aberration curves, astigmatic field curves and a distortion curve of the image capturing unit according to the 4th embodiment.

FIG. 10 is a schematic view of an image capturing unit according to the 4th embodiment of the present disclosure. FIG. 11 shows, in order from left to right, spherical aberration curves, astigmatic field curves and a distortion curve of the image capturing unit according to the 4th embodiment. In FIG. 10, the image capturing unit 4 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The imaging system lens assembly includes four lens elements (E1, E2, E3 and E4) with no additional lens element disposed between each of the adjacent four lens elements. There is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The reflective element E5 is made of glass material and located between the fourth lens element E4 and the image surface IMG, and will not affect the focal length of the imaging system lens assembly. The reflective element E5 is a prism which can provide optical path folding function. For the purpose of illustration, the optical path folding caused by the reflective element E5 is omitted in FIG. 10.

The filter E6 is made of glass material and located between the fourth lens element E4 and the image surface IMG, and will not affect the focal length of the imaging system lens assembly. The image sensor IS is disposed on or near the image surface IMG of the imaging system lens assembly.

The detailed optical data of the 4th embodiment are shown in Table 4A and the aspheric surface data are shown in Table 4B below.

TABLE 4A

4th Embodiment
f = 15.80 mm, Fno = 2.80, HFOV = 10.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.425 | | | | |
| 2 | Lens 1 | 9.2911 (SPH) | 1.036 | Glass | 1.589 | 61.3 | 15.05 |
| 3 | | −185.3292 (SPH) | 0.065 | | | | |
| 4 | Lens 2 | 3.8039 (ASP) | 0.905 | Plastic | 1.545 | 56.1 | 15.41 |
| 5 | | 6.3689 (ASP) | 0.040 | | | | |
| 6 | Lens 3 | 4.6557 (ASP) | 0.681 | Plastic | 1.614 | 25.6 | −9.70 |
| 7 | | 2.4677 (ASP) | 0.713 | | | | |
| 8 | Lens 4 | 21.9355 (ASP) | 0.440 | Plastic | 1.669 | 19.5 | 237.30 |
| 9 | | 25.2474 (ASP) | 0.590 | | | | |
| 10 | Stop | Plano | 0.353 | | | | |
| 11 | Prism | Plano | 12.912 | Glass | 1.516 | 64.1 | — |
| 12 | | Plano | 0.510 | | | | |
| 13 | Filter | Plano | 0.210 | Glass | 1.516 | 64.1 | — |
| 14 | | Plano | 0.407 | | | | |
| 15 | Image | Plano | — | | | | |

Note:
Reference wavelength is 587.6 nm (d-line).
An effective radius of the stop S1 (Surface 10) is 1.80 mm.

TABLE 4B

Aspheric Coefficients

| Surface # | 4 | 5 | 6 | 7 |
|---|---|---|---|---|
| k = | −1.453980E+00 | −9.027120E+00 | −1.585050E+00 | 0.000000E+00 |
| A4 = | 1.810644E−03 | −1.075145E−02 | −6.949752E−03 | 1.526405E−02 |
| A6 = | 1.212651E−03 | 2.242584E−02 | 1.296376E−02 | −1.562696E−02 |
| A8 = | −4.601436E−04 | −2.440501E−02 | −2.061643E−02 | 2.555940E−03 |
| A10 = | 1.634940E−04 | 1.773889E−02 | 1.717249E−02 | 3.130491E−03 |
| A12 = | −3.459215E−05 | −8.230337E−03 | −8.572655E−03 | −3.374747E−03 |
| A14 = | 3.844347E−06 | 2.451625E−03 | 2.702224E−03 | 1.597692E−03 |
| A16 = | −1.907390E−07 | −4.665397E−04 | −5.405294E−04 | −4.041920E−04 |
| A18 = | — | 5.469417E−05 | 6.643711E−05 | 5.276894E−05 |
| A20 = | — | −3.593288E−06 | −4.575011E−06 | −2.793654E−06 |
| A22 = | — | 1.011619E−07 | 1.352198E−07 | — |

TABLE 4B-continued

| Aspheric Coefficients | | | | |
|---|---|---|---|---|
| Surface # | 8 | 9 | — | — |
| k = | 0.000000E+00 | 0.000000E+00 | — | — |
| A4 = | 3.345912E−02 | 2.384946E−02 | — | — |
| A6 = | −1.760081E−02 | −1.434530E−02 | — | — |
| A8 = | 9.144587E−03 | 1.042624E−02 | — | — |
| A10 = | −3.314768E−03 | −6.452479E−03 | — | — |
| A12 = | 5.418522E−06 | 2.565590E−03 | — | — |
| A14 = | 5.373366E−04 | −5.848502E−04 | — | — |
| A16 = | −2.116074E−04 | 6.377914E−05 | — | — |
| A18 = | 3.489355E−05 | −9.635419E−07 | — | — |
| A20 = | −2.213646E−06 | −2.734476E−07 | — | — |

In the 4th embodiment, the equation of the aspheric surface profiles of the aforementioned lens elements is the same as the equation of the 1st embodiment. Also, the definitions of these parameters shown in Table 40 below are the same as those stated in the 1st embodiment with corresponding values for the 4th embodiment, so an explanation in this regard will not be provided again.

Moreover, these parameters can be calculated from Table 4A and Table 4B3 as the following values and satisfy the following conditions:

TABLE 4C

| Values of Conditional Expressions | | | |
|---|---|---|---|
| f [mm] | 15.80 | (R4 + R8)/(R4 − R8) | −1.67 |
| Fno | 2.80 | (|R5| + |R6|)/(|R7| + |R8|) | 0.15 |
| HFOV [deg.] | 10.0 | TD/(CT2 + CT3) | 2.45 |
| TD/BL | 0.26 | CT1/CT3 | 1.52 |
| TL/ImgH | 6.68 | CT3/T34 | 0.96 |
| BL/f | 0.95 | T34/CT4 | 1.62 |
| BL/ImgH | 5.31 | (CT2 + CT3)/ΣAT | 1.94 |
| f1/f2 | 0.98 | ΣCT/ΣAT | 3.74 |
| f2/f4 | 0.06 | |V1 − V2| | 5.2 |
| f/(|f2| + |f3|) | 0.63 | V1 − V3 | 35.7 |
| f2/f23 | −0.35 | (V2 + V3) − V1 | 20.4 |
| f2/R1 | 1.66 | V1/N1 | 38.6 |
| f2/R4 | 2.42 | Sag2R2/CT2 | 0.50 |
| f/(R7 + R8) | 0.33 | Sag3R2/CT3 | 1.23 |
| R4/R5 | 1.37 | Y4R2/Y1R1 | 0.66 |
| (R5 + R7)/(R5 − R7) | −1.54 | YI2R1/Y2R1 | 0.92 |

5th Embodiment

Figure 12:
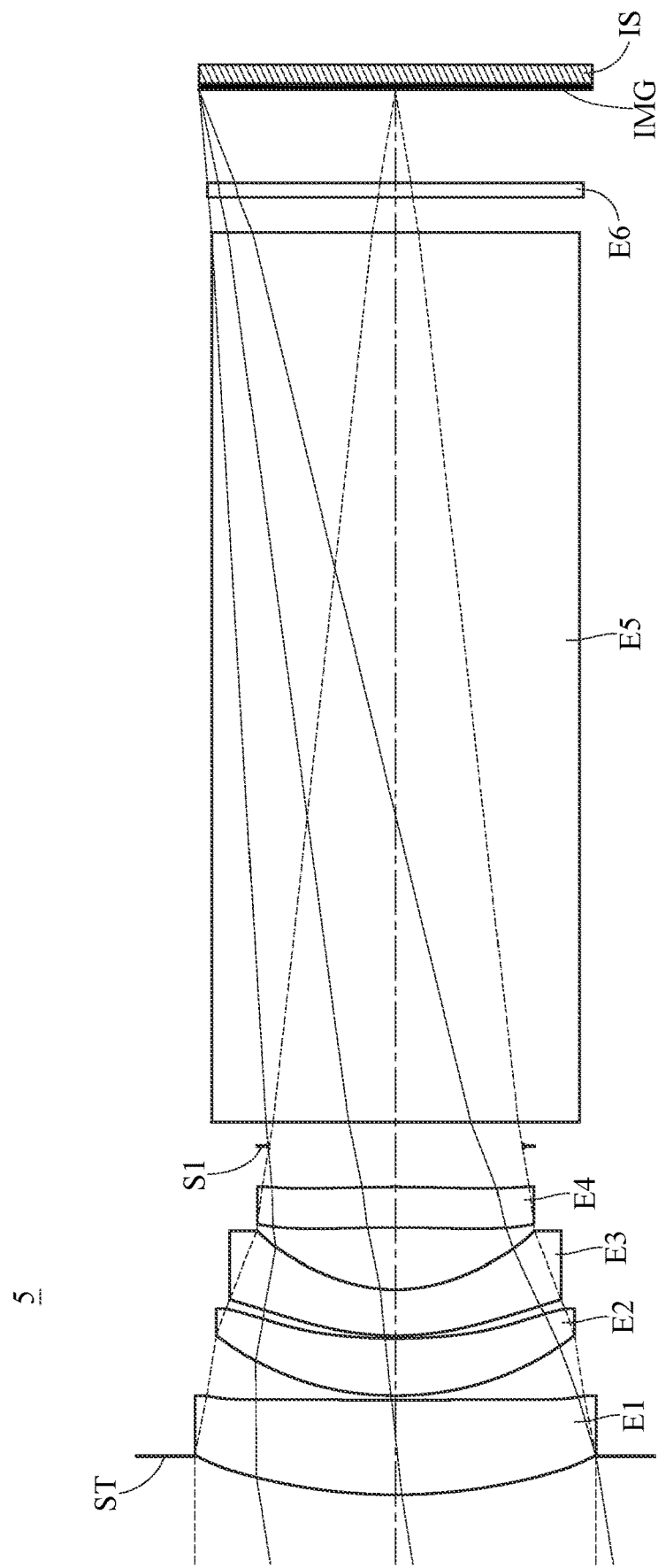
FIG. 12 is a schematic view of an image capturing unit according to the 5th embodiment of the present disclosure.
Figure 13:
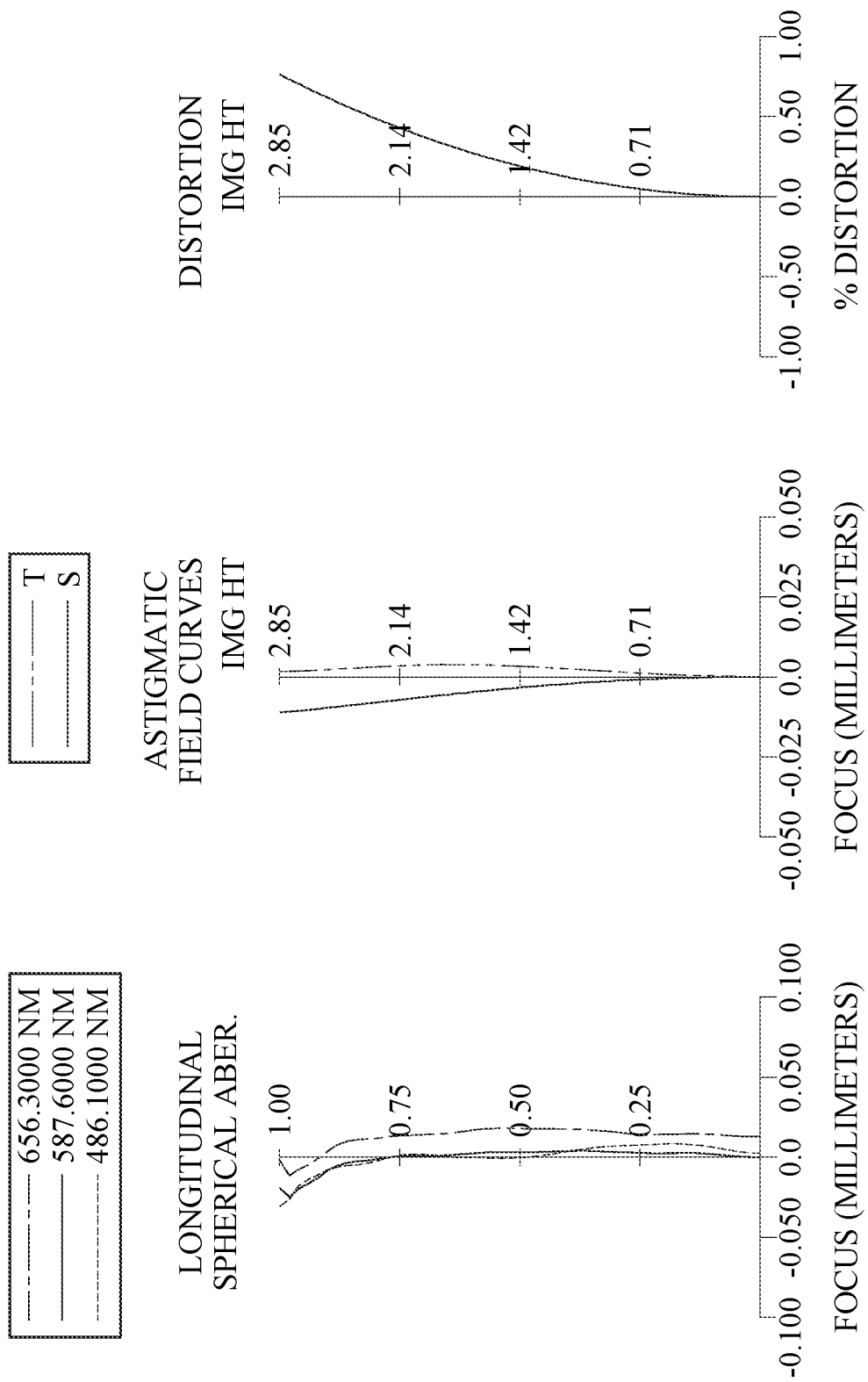
FIG. 13 shows spherical aberration curves, astigmatic field curves and a distortion curve of the image capturing unit according to the 5th embodiment.

FIG. 12 is a schematic view of an image capturing unit according to the 5th embodiment of the present disclosure. FIG. 13 shows, in order from left to right, spherical aberration curves, astigmatic field curves and a distortion curve of the image capturing unit according to the 5th embodiment. In FIG. 12, the image capturing unit 5 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The imaging system lens assembly includes four lens elements (E1, E2, E3 and E4) with no additional lens element disposed between each of the adjacent four lens elements. There is an air gap in a paraxial region between each of all adjacent lens elements among the first lens element E1 through the fourth lens element E4.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric.

The reflective element E5 is made of glass material and located between the fourth lens element E4 and the image surface IMG, and will not affect the focal length of the imaging system lens assembly. The reflective element E5 is a prism which can provide optical path folding function. For the purpose of illustration, the optical path folding caused by the reflective element E5 is omitted in FIG. 12.

The filter E6 is made of glass material and located between the fourth lens element E4 and the image surface IMG, and will not affect the focal length of the imaging system lens assembly. The image sensor IS is disposed on or near the image surface IMG of the imaging system lens assembly.

The detailed optical data of the 5th embodiment are shown in Table 5A and the aspheric surface data are shown in Table 5B below.

TABLE 5A

5th Embodiment
f = 17.33 mm, Fno = 2.98, HFOV = 9.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.559 | | | | |
| 2 | Lens 1 | 8.3295 (ASP) | 1.374 | Glass | 1.589 | 61.3 | 15.54 |
| 3 | | 86.9565 (ASP) | 0.065 | | | | |
| 4 | Lens 2 | 4.3814 (ASP) | 0.833 | Plastic | 1.544 | 56.0 | 16.32 |
| 5 | | 8.0701 (ASP) | 0.040 | | | | |
| 6 | Lens 3 | 4.0627 (ASP) | 0.668 | Plastic | 1.614 | 25.6 | −11.24 |
| 7 | | 2.3970 (ASP) | 0.900 | | | | |
| 8 | Lens 4 | −14.8217 (ASP) | 0.590 | Plastic | 1.686 | 18.4 | −149.40 |
| 9 | | −17.6079 (ASP) | 0.590 | | | | |
| 10 | Stop | Plano | 0.352 | | | | |
| 11 | Prism | Plano | 12.912 | Glass | 1.516 | 64.1 | — |
| 12 | | Plano | 0.510 | | | | |
| 13 | Filter | Plano | 0.210 | Glass | 1.516 | 64.1 | — |
| 14 | | Plano | 1.351 | | | | |
| 15 | Image | Plano | — | | | | |

Note:
Reference wavelength is 587.6 nm (d-line).
An effective radius of the stop S1 (Surface 10) is 1.85 mm.

TABLE 5B

Aspheric Coefficients

| Surface # | 2 | 3 | 4 | 5 |
|---|---|---|---|---|
| k = | 1.657310E−01 | −9.900000E+01 | −1.883040E+00 | −4.943810E+00 |
| A4 = | 1.058571E−04 | −1.627241E−03 | 1.000800E−03 | −3.854953E−03 |
| A6 = | −4.994024E−05 | 7.958684E−06 | 1.623365E−03 | 1.495121E−02 |
| A8 = | 2.415494E−06 | 1.813571E−05 | −4.909223E−04 | −1.285786E−02 |
| A10 = | 1.301590E−06 | 2.313963E−06 | 1.387254E−04 | 8.138072E−03 |
| A12 = | — | −8.423874E−09 | −3.544254E−05 | −3.705124E−03 |
| A14 = | — | — | 4.936177E−06 | 1.128636E−03 |
| A16 = | — | — | −2.571955E−07 | −2.223851E−04 |
| A18 = | — | — | — | 2.717304E−05 |
| A20 = | — | — | — | −1.872072E−06 |
| A22 = | — | — | — | 5.561505E−08 |

| Surface # | 6 | 7 | 8 | 9 |
|---|---|---|---|---|
| k = | −2.238180E+00 | 0.000000E+00 | 0.000000E+00 | 0.000000E+00 |
| A4 = | −4.269422E−03 | −1.022605E−03 | 1.828119E−02 | 1.217684E−02 |
| A6 = | 6.963412E−03 | −1.007366E−02 | −4.551068E−03 | −2.370209E−03 |
| A8 = | −1.008085E−02 | 1.253700E−03 | 6.470735E−04 | 2.125557E−04 |
| A10 = | 7.917298E−03 | 2.189676E−03 | 8.038332E−04 | 5.861008E−04 |
| A12 = | −4.064997E−03 | −2.078876E−03 | −7.964938E−04 | −5.104099E−04 |
| A14 = | 1.373672E−03 | 9.687471E−04 | 3.730757E−04 | 2.257036E−04 |
| A16 = | −2.971793E−04 | −2.473315E−04 | −9.559052E−05 | −5.816519E−05 |
| A18 = | 3.935617E−05 | 3.236435E−05 | 1.267487E−05 | 8.122677E−06 |
| A20 = | −2.902208E−06 | −1.693455E−06 | −6.823082E−07 | −4.765502E−07 |
| A22 = | 9.138561E−08 | — | — | — |

In the 5th embodiment, the equation of the aspheric surface profiles of the aforementioned lens elements is the same as the equation of the 1st embodiment. Also, the definitions of these parameters shown in Table 50 below are the same as those stated in the 1st embodiment with corresponding values for the 5th embodiment, so an explanation in this regard will not be provided again.

Moreover, these parameters can be calculated from Table 5A and Table 5B3 as the following values and satisfy the following conditions:

TABLE 5C

Values of Conditional Expressions

| | | | |
|---|---|---|---|
| f [mm] | 17.33 | (R4 + R8)/(R4 − R8) | −0.37 |
| Fno | 2.98 | (|R5| + |R6|)/(|R7| + |R8|) | 0.20 |
| HFOV [deg.] | 9.3 | TD/(CT2 + CT3) | 2.98 |
| TD/BL | 0.28 | CT1/CT3 | 2.06 |
| TL/ImgH | 7.16 | CT3/T34 | 0.74 |
| BL/f | 0.92 | T34/CT4 | 1.53 |
| BL/ImgH | 5.59 | (CT2 + CT3)/ΣAT | 1.49 |
| f1/f2 | 0.95 | ΣCT/ΣAT | 3.45 |
| f2/f4 | −0.11 | |V1 − V2| | 5.3 |
| f/(|f2| + |f3|) | 0.63 | V1 − V3 | 35.7 |
| f2/f23 | −0.24 | (V2 + V3) − V1 | 20.3 |
| f2/R1 | 1.96 | V1/N1 | 38.6 |
| f2/R4 | 2.02 | Sag2R2/CT2 | 0.52 |
| f/(R7 + R8) | −0.53 | Sag3R2/CT3 | 1.27 |
| R4/R5 | 1.99 | Y4R2/Y1R1 | 0.67 |
| (R5 + R7)/(R5 − R7) | −0.57 | YI2R1/Y2R1 | 1.00 |

6th Embodiment

Figure 14:
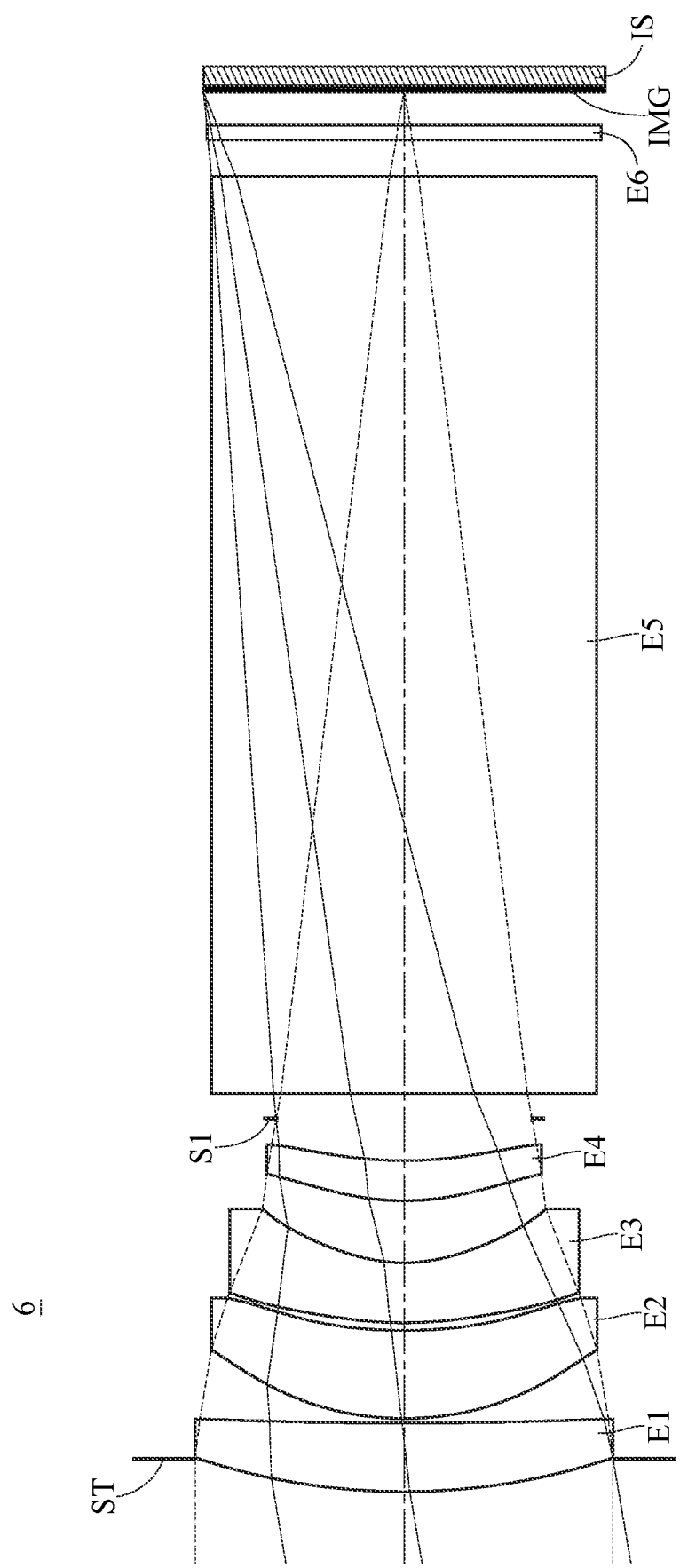
FIG. 14 is a schematic view of an image capturing unit according to the 6th embodiment of the present disclosure.
Figure 15:
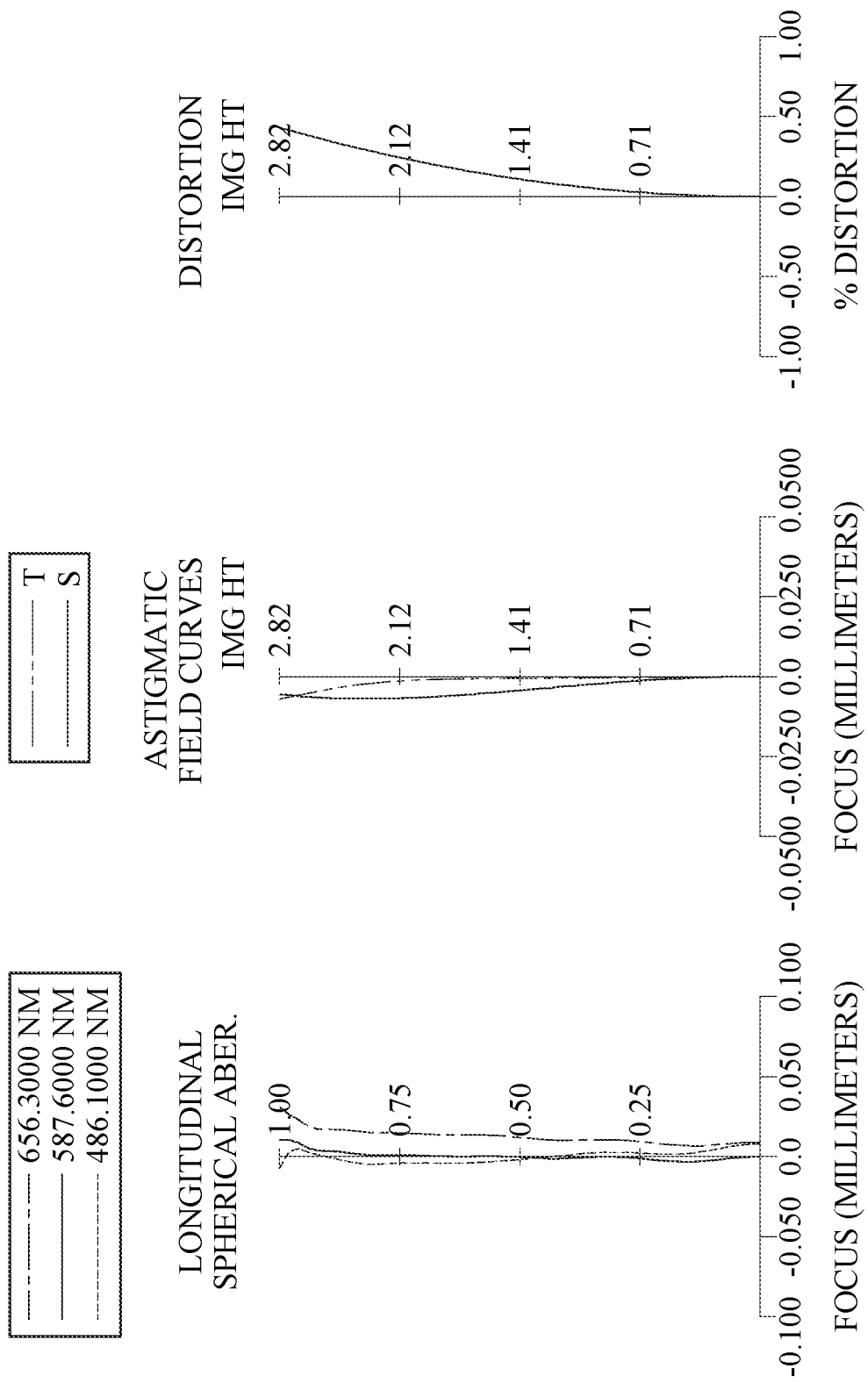
FIG. 15 shows spherical aberration curves, astigmatic field curves and a distortion curve of the image capturing unit according to the 6th embodiment.

FIG. 14 is a schematic view of an image capturing unit according to the 6th embodiment of the present disclosure. FIG. 15 shows, in order from left to right, spherical aberration curves, astigmatic field curves and a distortion curve of the image capturing unit according to the 6th embodiment. In FIG. 14, the image capturing unit 6 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The imaging system lens assembly includes four lens elements (E1, E2, E3 and E4) with no additional lens element disposed between each of the adjacent four lens elements. There is an air gap in a paraxial region between each of all adjacent lens elements among the first lens element E1 through the fourth lens element E4.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric.

The reflective element E5 is made of glass material and located between the fourth lens element E4 and the image surface IMG, and will not affect the focal length of the imaging system lens assembly. The reflective element E5 is a prism which can provide optical path folding function. For the purpose of illustration, the optical path folding caused by the reflective element E5 is omitted in FIG. 14.

The filter E6 is made of glass material and located between the fourth lens element E4 and the image surface IMG, and will not affect the focal length of the imaging system lens assembly. The image sensor IS is disposed on or near the image surface IMG of the imaging system lens assembly.

The detailed optical data of the 6th embodiment are shown in Table 6A and the aspheric surface data are shown in Table 6B3 below.

TABLE 6A

6th Embodiment
f = 16.45 mm, Fno = 2.80, HFOV = 9.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.466 | | | | |
| 2 | Lens 1 | 9.2543 (SPH) | 0.965 | Glass | 1.569 | 56.0 | 18.59 |
| 3 | | 71.4286 (SPH) | 0.065 | | | | |
| 4 | Lens 2 | 4.2563 (ASP) | 1.238 | Plastic | 1.544 | 56.0 | 16.74 |
| 5 | | 7.1702 (ASP) | 0.109 | | | | |
| 6 | Lens 3 | 5.4609 (ASP) | 0.845 | Plastic | 1.614 | 25.6 | −6.82 |
| 7 | | 2.2290 (ASP) | 0.873 | | | | |
| 8 | Lens 4 | 3.5631 (ASP) | 0.565 | Plastic | 1.566 | 37.4 | 14.41 |
| 9 | | 5.9627 (ASP) | 0.590 | | | | |
| 10 | Stop | Plano | 0.352 | | | | |
| 11 | Prism | Plano | 12.912 | Glass | 1.516 | 64.1 | — |
| 12 | | Plano | 0.510 | | | | |

TABLE 6A-continued

6th Embodiment
f = 16.45 mm, Fno = 2.80, HFOV = 9.7 deg.

| Surface # | | Curvature Radius | Thickness | Material | Index | Abbe # | Focal Length |
|---|---|---|---|---|---|---|---|
| 13 | Filter | Plano | 0.210 | Glass | 1.516 | 64.1 | — |
| 14 | | Plano | 0.463 | | | | |
| 15 | Image | Plano | — | | | | |

Note:
Reference wavelength is 587.6 nm (d-line).
An effective radius of the stop S1 (Surface 10) is 1.80 mm.

TABLE 6B

Aspheric Coefficients

| Surface # | 4 | 5 | 6 | 7 |
|---|---|---|---|---|
| k = | −1.675560E+00 | −5.547030E+00 | −2.571360E+00 | 0.000000E+00 |
| A4 = | 4.777993E−03 | 1.446756E−02 | −4.675965E−03 | −3.647105E−02 |
| A6 = | −3.424698E−04 | −1.149401E−02 | −8.828436E−03 | 1.728773E−03 |
| A8 = | 1.722485E−04 | 9.425541E−03 | 1.030619E−02 | 2.234500E−03 |
| A10 = | −6.169484E−05 | −4.831956E−03 | −5.846834E−03 | −1.681366E−03 |
| A12 = | 1.135825E−05 | 1.454156E−03 | 1.998016E−03 | 5.417231E−04 |
| A14 = | −1.126349E−06 | −2.521044E−04 | −4.237623E−04 | −5.203193E−05 |
| A16 = | 4.314174E−08 | 2.200755E−05 | 5.506934E−05 | −1.933969E−05 |
| A18 = | — | −3.155478E−07 | −4.115741E−06 | 6.101319E−06 |
| A20 = | — | −8.985464E−08 | 1.483177E−07 | −5.303549E−07 |
| A22 = | — | 4.880010E−09 | −1.334949E−09 | — |

| Surface # | 8 | 9 | — | — |
|---|---|---|---|---|
| k = | 0.000000E+00 | 0.000000E+00 | — | — |
| A4 = | −9.408339E−03 | −5.227196E−04 | — | — |
| A6 = | −1.487948E−03 | −1.493339E−03 | — | — |
| A8 = | −5.529327E−04 | −1.035010E−03 | — | — |
| A10 = | 6.229297E−04 | 1.073378E−03 | — | — |
| A12 = | −3.089006E−04 | −5.792826E−04 | — | — |
| A14 = | 1.025564E−04 | 2.001801E−04 | — | — |
| A16 = | −2.356995E−05 | −4.446778E−05 | — | — |
| A18 = | 3.321704E−06 | 5.789844E−06 | — | — |
| A20 = | −2.090570E−07 | −3.348710E−07 | — | — |

In the 6th embodiment, the equation of the aspheric surface profiles of the aforementioned lens elements is the same as the equation of the 1st embodiment. Also, the definitions of these parameters shown in Table 60 below are the same as those stated in the 1st embodiment with corresponding values for the 6th embodiment, so an explanation in this regard will not be provided again.

Moreover, these parameters can be calculated from Table 6A and Table 6B3 as the following values and satisfy the following conditions:

TABLE 6C

Values of Conditional Expressions

| f [mm] | 16.45 | (R4 + R8)/(R4 − R8) | 10.88 |
|---|---|---|---|
| Fno | 2.80 | (|R5| + |R6|)/(|R7| + |R8|) | 0.81 |
| HFOV [deg.] | 9.7 | TD/(CT2 + CT3) | 2.24 |
| TD/BL | 0.31 | CT1/CT3 | 1.14 |
| TL/ImgH | 6.98 | CT3/T34 | 0.97 |
| BL/f | 0.91 | T34/CT4 | 1.55 |
| BL/ImgH | 5.33 | (CT2 + CT3)/ΣAT | 1.99 |
| f1/f2 | 1.11 | ΣCT/ΣAT | 3.45 |
| f2/f4 | 1.16 | |V1 − V2| | 0.0 |
| f/(|f2| + |f3|) | 0.70 | V1 − V3 | 30.4 |
| f2/f23 | −1.04 | (V2 + V3) − V1 | 25.6 |
| f2/R1 | 1.81 | V1/N1 | 35.7 |
| f2/R4 | 2.34 | Sag2R2/CT2 | 0.37 |

TABLE 6C-continued

Values of Conditional Expressions

| f/(R7 + R8) | 1.73 | Sag3R2/CT3 | 0.90 |
|---|---|---|---|
| R4/R5 | 1.31 | Y4R2/Y1R1 | 0.64 |
| (R5 + R7)/(R5 − R7) | 4.75 | YI2R1/Y2R1 | 0.91 |

7th Embodiment

Figure 16:
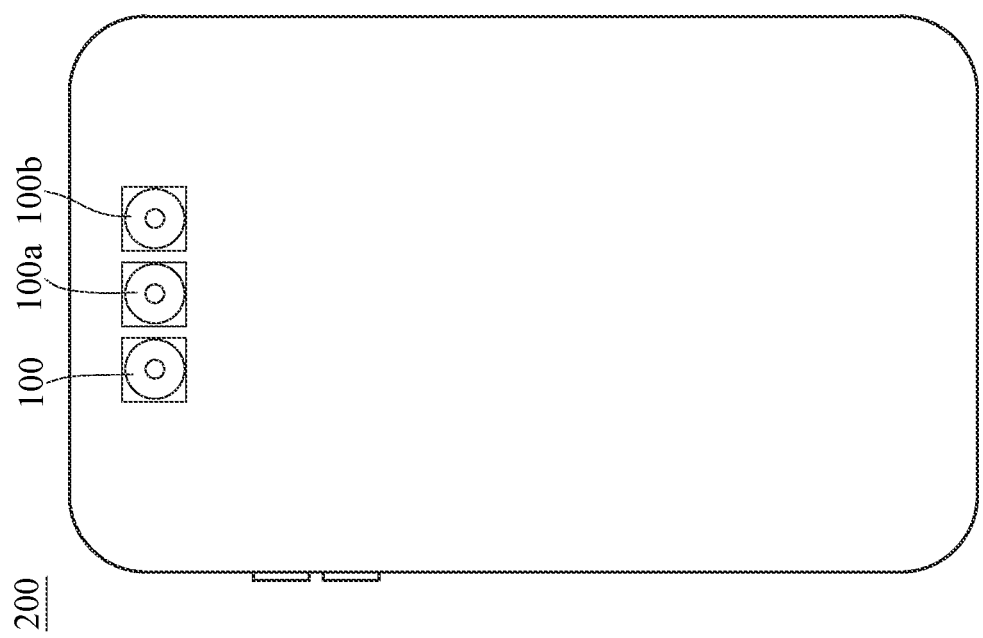
FIG. 16 is one perspective view of an electronic device according to the 7th embodiment of the present disclosure.
Figure 17:
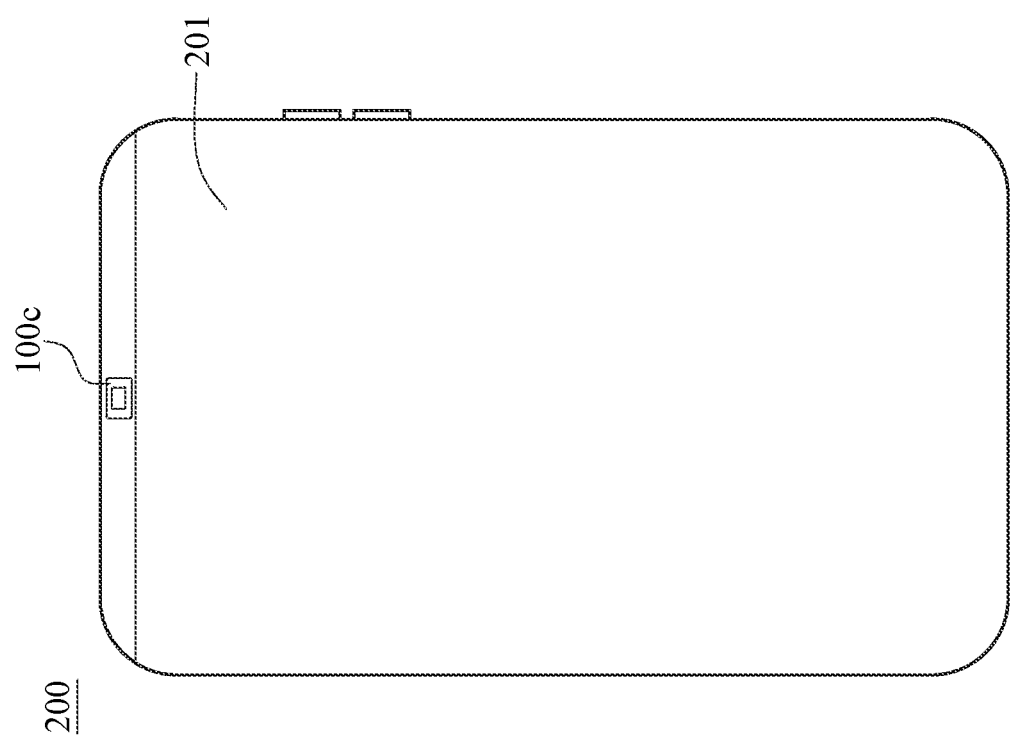
FIG. 17 is another perspective view of the electronic device in FIG. 16.

FIG. 16 is one perspective view of an electronic device according to the 7th embodiment of the present disclosure, and FIG. 17 is another perspective view of the electronic device in FIG. 16.

In this embodiment, an electronic device 200 is a smartphone including the image capturing unit 100, an image capturing unit 100a, an image capturing unit 100b, an image capturing unit 100c and a display module 201. The image capturing unit 100 can be any one of the image capturing unit disclosed in the aforementioned embodiments. As shown in FIG. 16, the image capturing unit 100, the image capturing unit 100a and the image capturing unit 100b are disposed on the same side of the electronic device 200, and each of the image capturing unit 100, 100a and 100b has a single focal point. As shown in FIG. 17, the image capturing unit 100c and the display module 201 are disposed on the opposite side of the electronic device 200. The image capturing unit 100c can be a front-facing camera of the electronic device 200 for taking selfies, but the present disclosure is not limited thereto. Furthermore, each of the image capturing units 100, 100a and 100b can include the imaging system lens assembly, a barrel and a holder member for holding the imaging system lens assembly.

The image capturing unit 100 is a telephoto image capturing unit, the image capturing unit 100a is a wide-angle image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality for various applications with different requirements. The image capturing unit 100c can have a non-circular opening, and optical components in the image capturing unit 100c can have trimmed edges at their outermost positions so as to coordinate with the shape of the non-circular opening. Therefore, it is favorable for reducing the size of the image capturing unit 100c so as to increase the ratio of the area of the display module 201 relative to that of the electronic device 200, and reduce the thickness of the electronic device 200. In this embodiment, the electronic device 200 includes multiple image capturing units 100, 100a, 100b and 100c, but the present disclosure is not limited to the number and arrangement of image capturing units.

8th Embodiment

Figure 18:
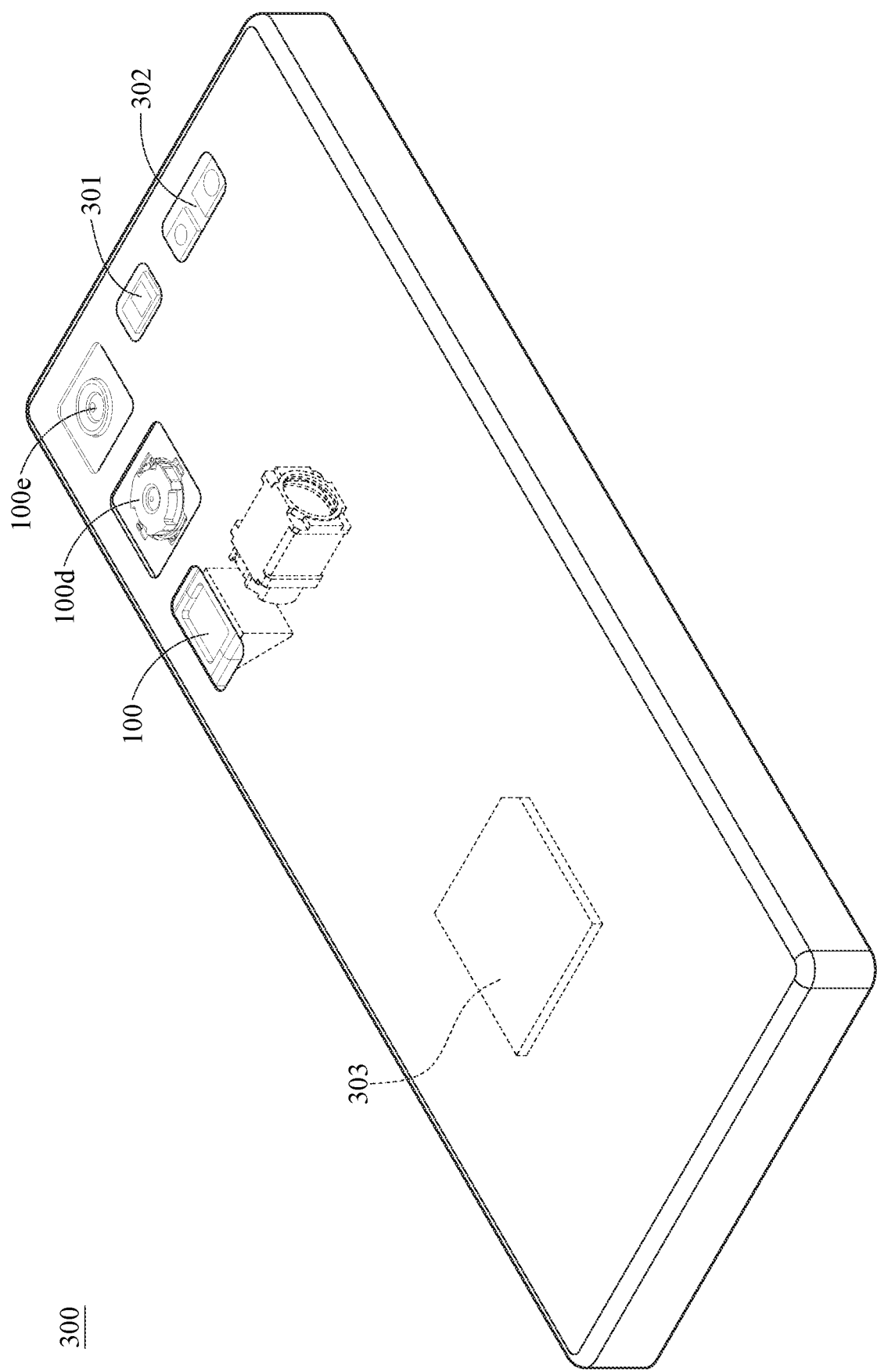
FIG. 18 is one perspective view of an electronic device according to the 8th embodiment of the present disclosure.
Figure 19:
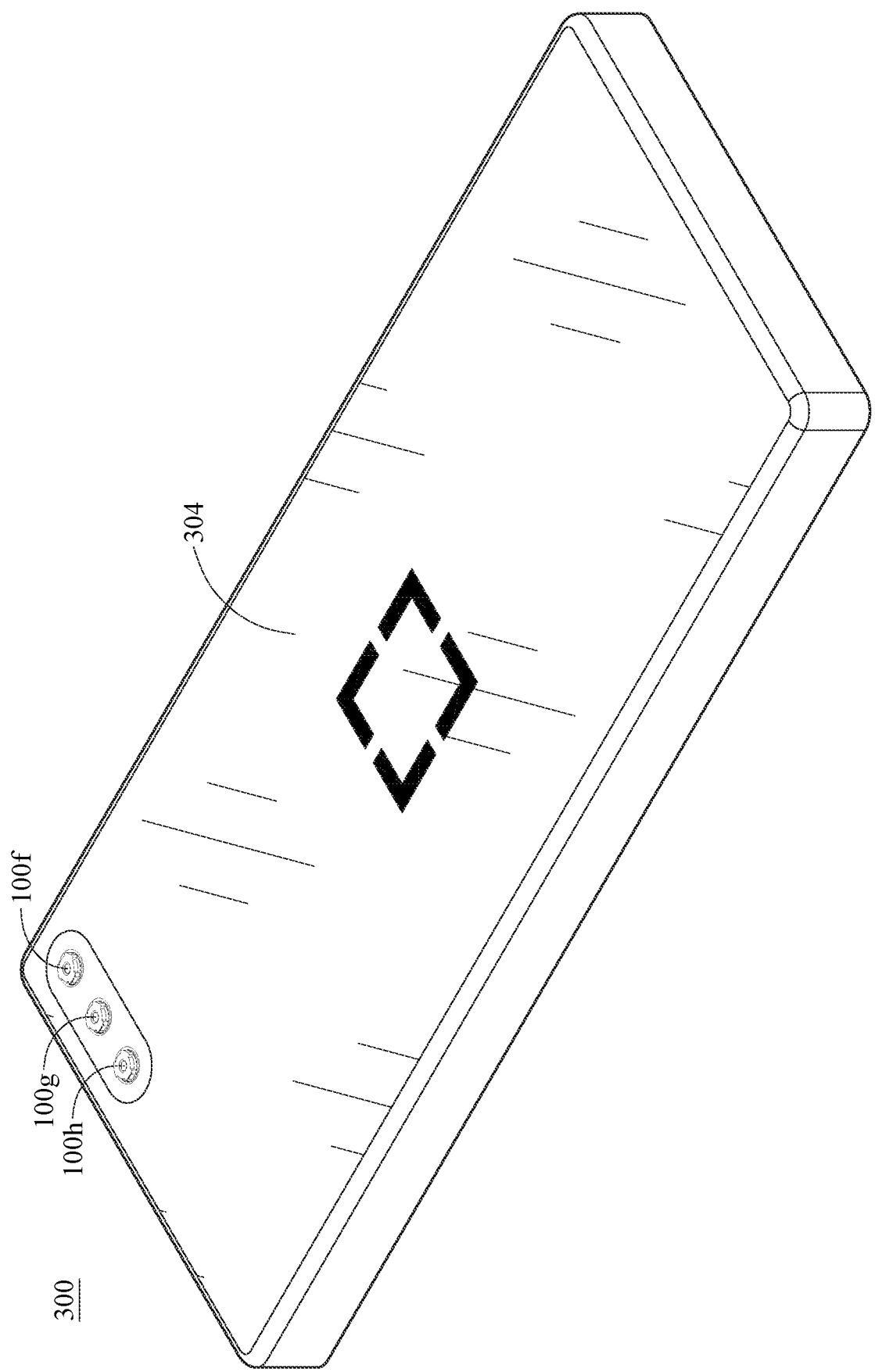
FIG. 19 is another perspective view of the electronic device in FIG. 18.
Figure 20:
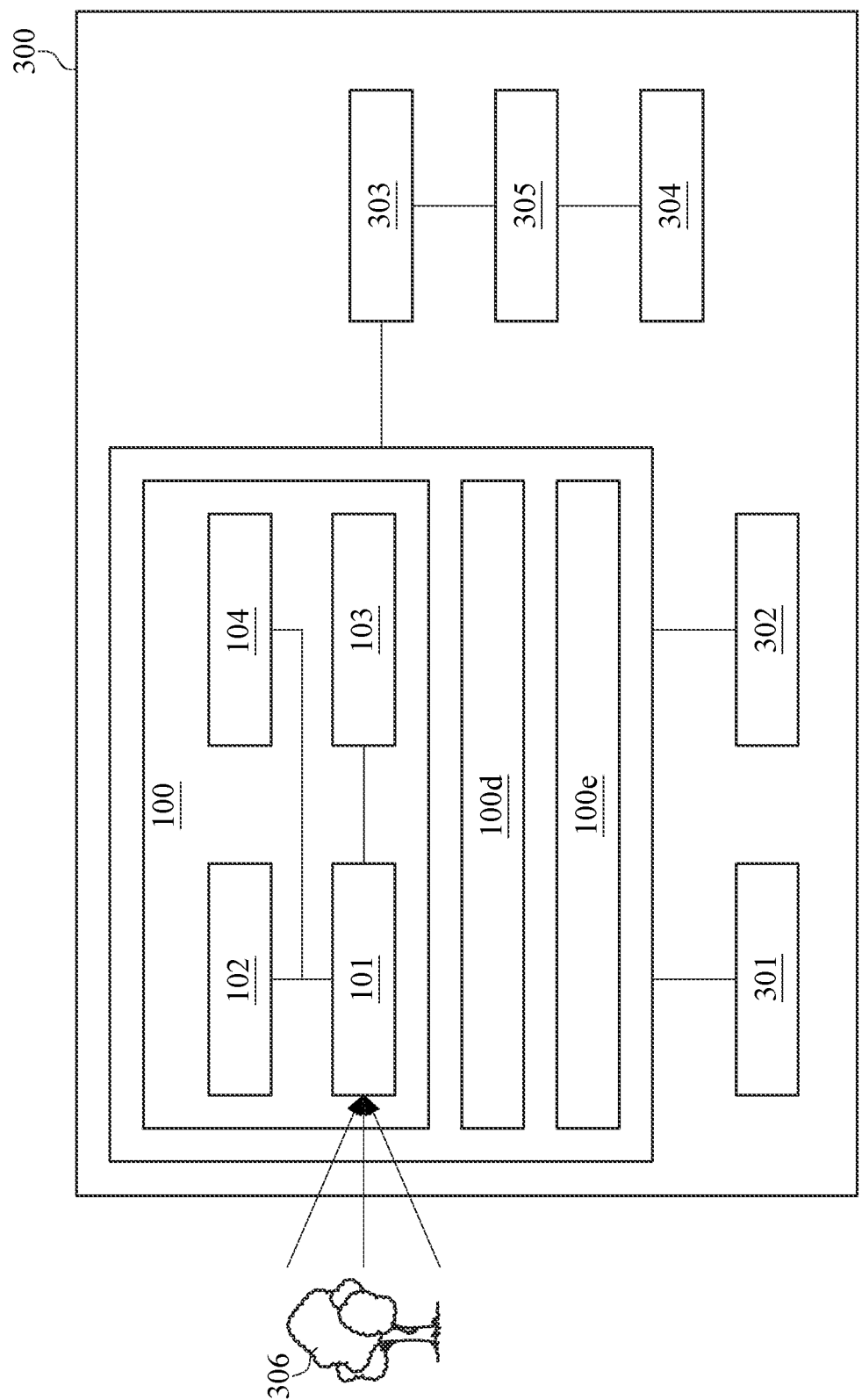
FIG. 20 is a block diagram of the electronic device in FIG. 18.

FIG. 18 is one perspective view of an electronic device according to the 8th embodiment of the present disclosure. FIG. 19 is another perspective view of the electronic device in FIG. 18. FIG. 20 is a block diagram of the electronic device in FIG. 18.

In this embodiment, an electronic device 300 is a smartphone including the image capturing unit 100, an image capturing unit 100d, an image capturing unit 100e, an image capturing unit 100f, an image capturing unit 100g, an image capturing unit 100h, a flash module 301, a focus assist module 302, an image signal processor 303, a display module 304 and an image software processor 305. The image capturing unit 100 can be any one of the image capturing unit disclosed in the aforementioned embodiments. The image capturing unit 100, the image capturing unit 100d and the image capturing unit 100e are disposed on the same side of the electronic device 300. The focus assist module 302 can be a laser rangefinder or a ToF (time of flight) module, but the present disclosure is not limited thereto. The image capturing unit 100f, the image capturing unit 100g, the image capturing unit 100h and the display module 304 are disposed on the opposite side of the electronic device 300, and the display module 304 can be a user interface, such that the image capturing units 100f, 100g, 100h can be front-facing cameras of the electronic device 300 for taking selfies, but the present disclosure is not limited thereto. Furthermore, each of the image capturing units 100d, 100e, 100f, 100g and 100h can include the imaging system lens assembly of the present disclosure and can have a configuration similar to that of the image capturing unit 100. In detail, each of the image capturing units 100d, 100e, 100f, 100g and 100h can include a lens unit, a driving device, an image sensor and an image stabilizer, and each of the lens unit can include an optical lens assembly such as the imaging system lens assembly of the present disclosure, a barrel and a holder member for holding the optical lens assembly.

The image capturing unit 100 is a telephoto image capturing unit with optical path folding function, the image capturing unit 100d is a wide-angle image capturing unit, the image capturing unit 100e is an ultra-wide-angle image capturing unit, the image capturing unit 100f is a wide-angle image capturing unit, the image capturing unit 100g is an ultra-wide-angle image capturing unit, and the image capturing unit 100h is a ToF image capturing unit. In this embodiment, the image capturing units 100, 100d and 100e have different fields of view, such that the electronic device 300 can have various magnification ratios so as to meet the requirement of optical zoom functionality. In addition, the image capturing unit 100h can determine depth information of the imaged object. In this embodiment, the electronic device 300 includes multiple image capturing units 100, 100d, 100e, 100f, 100g and 100h, but the present disclosure is not limited to the number and arrangement of image capturing units.

When a user captures images of an object 306, the light rays converge in the image capturing unit 100, 100d or 100e to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100f, 100g or 100h to generate images. The display module 304 can include a touch screen, and the user is able to interact with the display module 304 and the image software processor 305 having multiple functions to capture images and complete image processing. Alternatively, the user may capture images via a physical button.

The image processed by the image software processor 305 can be displayed on the display module 304.

9th Embodiment

Figure 21:
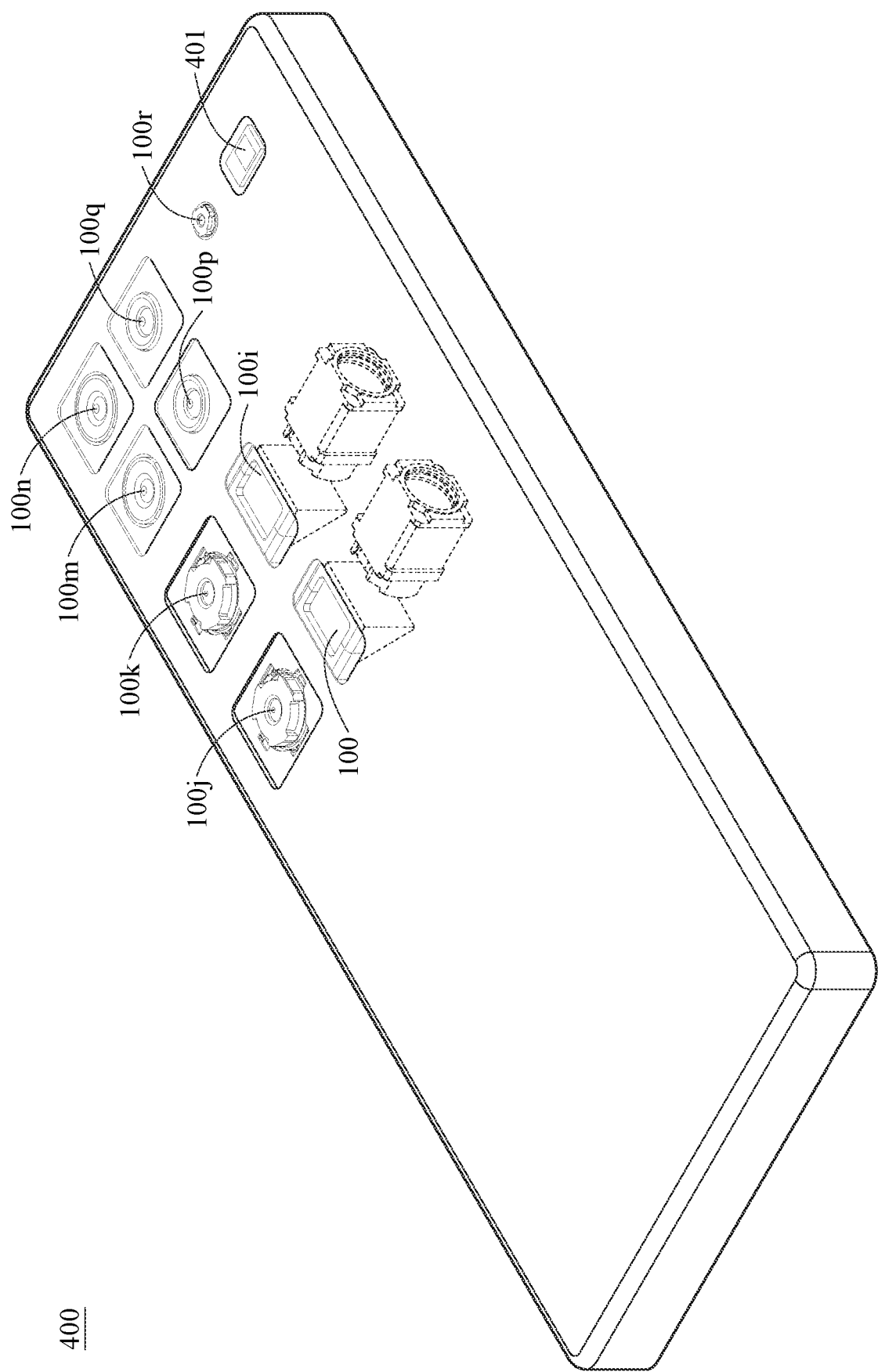
FIG. 21 is one perspective view of an electronic device according to the 9th embodiment of the present disclosure.

FIG. 21 is one perspective view of an electronic device according to the 9th embodiment of the present disclosure.

In this embodiment, an electronic device 400 is a smartphone including the image capturing unit 100, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing unit 100 can be any one of the image capturing unit disclosed in the aforementioned embodiments. The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100i, 100j, 100k, 100m, 100n, 100p, 100q and 100r can include the imaging system lens assembly of the present disclosure and can have a configuration similar to that of the image capturing unit 100, and the details in this regard will not be provided again.

The image capturing unit 100 is a telephoto image capturing unit with optical path folding function, the image capturing unit 100i is a telephoto image capturing unit with optical path folding function, the image capturing unit 100*j* is a wide-angle image capturing unit, the image capturing unit 100*k* is a wide-angle image capturing unit, the image capturing unit 100*m* is an ultra-wide-angle image capturing unit, the image capturing unit 100*n* is an ultra-wide-angle image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p*, 100*q* and 100*r* have different fields of view, such that the electronic device 400 can have various magnification ratios so as to meet the requirement of optical zoom functionality. Moreover, each of the image capturing units 100*g* and 100*h* can be a telephoto image capturing unit having a light-folding element configuration. In addition, the image capturing unit 100*r* can determine depth information of the imaged object. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging system lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-6C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system lens assembly comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;

wherein the object-side surface of the first lens element is convex in a paraxial region thereof, the second lens element has positive refractive power, and the object-side surface of the third lens element is convex in a paraxial region thereof;

wherein an axial distance between the object-side surface of the first lens element and the image-side surface of the fourth lens element is TD, an axial distance between the image-side surface of the fourth lens element and an image surface is BL, an f-number of the imaging system lens assembly is Fno, an Abbe number of the first lens element is V1, a refractive index of the first lens element is N1, a curvature radius of the object-side surface of the third lens element is R5, a curvature radius of the image-side surface of the third lens element is R6, a curvature radius of the object-side surface of the fourth lens element is R7, a curvature radius of the image-side surface of the fourth lens element is R8, and the following conditions are satisfied:

$0 < TD/BL < 0.42;$ $1.0 < Fno < 4.0;$ $22.0 < V1/N1 < 40.5;$ and $0 < (|R5|+|R6|)/(|R7|+|R8|) < 1.2.$ 2. The imaging system lens assembly of claim 1, wherein the Abbe number of the first lens element is V1, the refractive index of the first lens element is N1, and the following condition is satisfied:

$30.0 < V1/N1 < 39.5.$

3. The imaging system lens assembly of claim 1, wherein the first lens element has positive refractive power, an axial distance between the object-side surface of the first lens element and the image surface is TL, a maximum image height of the imaging system lens assembly is ImgH, and the following condition is satisfied:

$4.5 < TL/ImgH < 15.0.$

4. The imaging system lens assembly of claim 1, wherein a curvature radius of the image-side surface of the second lens element is R4, the curvature radius of the object-side surface of the third lens element is R5, the curvature radius of the object-side surface of the fourth lens element is R7, a focal length of the second lens element is f2, and the following conditions are satisfied:

$-5.5 < (R5+R7)/(R5-R7) < 2.0;$ and $0 < f2/R4 < 2.75.$

5. The imaging system lens assembly of claim 1, wherein a focal length of the imaging system lens assembly is f, a focal length of the second lens element is f2, a focal length of the third lens element is f3, an axial distance between the third lens element and the fourth lens element is T34, a central thickness of the fourth lens element is CT4, and the following conditions are satisfied:

$0.60 < f/(|f2|+|f3|) < 0.80;$ and $1.35 < T34/CT4 < 5.0.$

6. The imaging system lens assembly of claim 1, wherein the axial distance between the object-side surface of the first lens element and the image-side surface of the fourth lens element is TD, a central thickness of the second lens element is CT2, a central thickness of the third lens element is CT3, and the following condition is satisfied:

$$0<TD/(CT2+CT3)<3.0.$$

7. The imaging system lens assembly of claim 1, wherein a sum of central thicknesses of all lens elements of the imaging system lens assembly is ΣCT, a sum of axial distances between each of all adjacent lens elements of the imaging system lens assembly is ΣAT, a curvature radius of the image-side surface of the second lens element is R4, the curvature radius of the object-side surface of the third lens element is R5, and the following conditions are satisfied:

$$3.1<\Sigma CT/\Sigma AT<4.2; \text{ and}$$

$$0<R4/R5<2.0.$$

8. The imaging system lens assembly of claim 1, wherein the Abbe number of the first lens element is V1, an Abbe number of the second lens element is V2, and the following condition is satisfied:

$$0\leq|V1-V2|<7.0.$$

9. The imaging system lens assembly of claim 1, wherein a maximum effective radius of the object-side surface of the first lens element is Y1R1, a maximum effective radius of the image-side surface of the fourth lens element is Y4R2, half of a maximum field of view of the imaging system lens assembly is HFOV, and the following conditions are satisfied:

$$0<Y4R2/Y1R1<1.0; \text{ and}$$

$$8.0 \text{ degrees}<\text{HFOV}<20.0 \text{ degrees}.$$

10. The imaging system lens assembly of claim 1, further comprising a reflective element, wherein the reflective element is disposed between an imaged object and the image surface.

11. The imaging system lens assembly of claim 10, wherein the reflective element is disposed at an object side of the object-side surface of the first lens element or an image side of the image-side surface of the fourth lens element.

12. An image capturing unit comprising:
the imaging system lens assembly of claim 1; and
an image sensor disposed on the image surface of the imaging system lens assembly.

13. An electronic device comprising:
the image capturing unit of claim 12.

14. An imaging system lens assembly comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;
wherein the second lens element has positive refractive power, the image-side surface of the second lens element is concave in a paraxial region thereof, and the object-side surface of the third lens element is convex in a paraxial region thereof;
wherein an axial distance between the object-side surface of the first lens element and the image-side surface of the fourth lens element is TD, an axial distance between the image-side surface of the fourth lens element and an image surface is BL, an Abbe number of the first lens element is V1, an Abbe number of the second lens element is V2, an Abbe number of the third lens element is V3, a focal length of the second lens element is f2, a focal length of the fourth lens element is f4, and the following conditions are satisfied:

$$0<TD/BL<0.42;$$

$$16.0<(V2+V3)-V1<40.0; \text{ and}$$

$$f2/f4<0.48.$$

15. The imaging system lens assembly of claim 14, wherein the first lens element has positive refractive power, the object-side surface of the second lens element is convex in a paraxial region thereof, the axial distance between the image-side surface of the fourth lens element and the image surface is BL, a focal length of the imaging system lens assembly is f, and the following condition is satisfied:

$$0.75<BL/f<2.0.$$

16. The imaging system lens assembly of claim 14, wherein an air gap in a paraxial region between each of all adjacent lens elements among the first lens element through the fourth lens element, a central thickness of the first lens element is CT1, a central thickness of the third lens element is CT3, and the following condition is satisfied:

$$0<CT1/CT3<2.35.$$

17. The imaging system lens assembly of claim 14, wherein the focal length of the second lens element is f2, a composite focal length of the second lens element and the third lens element is f23, a displacement in parallel with an optical axis from an axial vertex of the image-side surface of the third lens element to a maximum effective radius position of the image-side surface of the third lens element is Sag3R2, a central thickness of the third lens element is CT3, and the following conditions are satisfied:

$$-0.40<f2/f23<-0.15; \text{ and}$$

$$0<Sag3R2/CT3<1.45.$$

18. The imaging system lens assembly of claim 14, wherein the focal length of the second lens element is f2, a curvature radius of the object-side surface of the first lens element is R1, a central thickness of the second lens element is CT2, a central thickness of the third lens element is CT3, a sum of axial distances between each of all adjacent lens elements of the imaging system lens assembly is ΣAT, and the following conditions are satisfied:

$$0<f2/R1<2.0; \text{ and}$$

$$1.45<(CT2+CT3)/\Sigma AT<2.5.$$

19. The imaging system lens assembly of claim 14, wherein the object-side surface of the second lens element has at least one inflection point, a central thickness of the third lens element is CT3, an axial distance between the third lens element and the fourth lens element is T34, a vertical distance between the at least one inflection point on the object-side surface of the second lens element and an optical axis is YI2R1, a maximum effective radius of the object-side surface of the second lens element is Y2R1, and the following conditions are satisfied:

$$0.52<CT3/T34<1.38; \text{ and}$$

$$0.5<YI2R1/Y2R1<0.95.$$

20. An imaging system lens assembly comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;

wherein the first lens element has positive refractive power, the second lens element has positive refractive power, the object-side surface of the third lens element is convex in a paraxial region thereof, and the image-side surface of the third lens element is concave in a paraxial region thereof;

wherein an axial distance between the object-side surface of the first lens element and the image-side surface of the fourth lens element is TD, an axial distance between the image-side surface of the fourth lens element and an image surface is BL, an f-number of the imaging system lens assembly is Fno, a curvature radius of the image-side surface of the second lens element is R4, a curvature radius of the image-side surface of the fourth lens element is R8, a focal length of the first lens element is f1, a focal length of the second lens element is f2, and the following conditions are satisfied:

$0<TD/BL<0.42$;

$1.0<Fno<4.0$;

$-10.0<(R4+R8)/(R4-R8)<0.4$; and $0.90<f1/f2<5.0$.

21. The imaging system lens assembly of claim 20, wherein the image-side surface of the second lens element is concave in a paraxial region thereof, the curvature radius of the image-side surface of the second lens element is R4, the curvature radius of the image-side surface of the fourth lens element is R8, and the following condition is satisfied:

$-6.0<(R4+R8)/(R4-R8)<-1.2$.

22. The imaging system lens assembly of claim 20, further comprising an aperture stop disposed between an imaged object and the second lens element, wherein the axial distance between the image-side surface of the fourth lens element and the image surface is BL, a maximum image height of the imaging system lens assembly is ImgH, and the following condition is satisfied:

$3.0<BL/ImgH<8.0$.

23. The imaging system lens assembly of claim 20, wherein a focal length of the imaging system lens assembly is f, a curvature radius of the object-side surface of the fourth lens element is R7, the curvature radius of the image-side surface of the fourth lens element is R8, a displacement in parallel with an optical axis from an axial vertex of the image-side surface of the second lens element to a maximum effective radius position of the image-side surface of the second lens element is Sag2R2, a central thickness of the second lens element is CT2, and the following conditions are satisfied:

$-0.8<f/(R7+R8)<1.1$; and $0.30<Sag2R2/CT2<0.60$.

24. The imaging system lens assembly of claim 20, wherein the imaging system lens assembly comprises at least one positive lens element, an Abbe number of the at least one positive lens element is smaller than 30.0, an Abbe number of the first lens element is V1, an Abbe number of the third lens element is V3, and the following condition is satisfied:

$20.0<V1-V3<39.0$.

25. The imaging system lens assembly of claim 20, further comprising a reflective element, wherein the reflective element is disposed between the fourth lens element and the image surface.

26. The imaging system lens assembly of claim 20, further comprising a reflective element, wherein the reflective element comprises at least two reflective surfaces.

* * * * *